(12) United States Patent
Miyazaki et al.

(10) Patent No.: US 10,816,713 B2
(45) Date of Patent: Oct. 27, 2020

(54) SURFACE LIGHT SOURCE DEVICE, DISPLAY DEVICE, AND ELECTRONIC DEVICE

(71) Applicant: Omron Corporation, Kyoto (JP)

(72) Inventors: Shinji Miyazaki, Saitama (JP); Kota Yonezawa, Saitama (JP); Masakazu Komano, Nara (JP); Tetsuo Hayashi, Saitama (JP); Junichiro Tsuji, Saitama (JP); Daido Uchida, Osaka (JP); Koichi Takemura, Saitama (JP); Kazunori Harada, Saitama (JP); Takashi Onishi, Osaka (JP); Kazuhide Hirota, Shiga (JP); Kazuyuki Otake, Saitama (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/467,685

(22) PCT Filed: Feb. 27, 2018

(86) PCT No.: PCT/JP2018/007233
§ 371 (c)(1),
(2) Date: Jun. 7, 2019

(87) PCT Pub. No.: WO2018/159603
PCT Pub. Date: Sep. 7, 2018

(65) Prior Publication Data
US 2020/0064533 A1    Feb. 27, 2020

(30) Foreign Application Priority Data

Mar. 2, 2017  (JP) ................................. 2017-039567
Feb. 7, 2018  (JP) ................................. 2018-019910

(51) Int. Cl.
*G02F 1/1333*  (2006.01)
*F21V 8/00*  (2006.01)
(Continued)

(52) U.S. Cl.
CPC .......... *G02B 6/0023* (2013.01); *F21V 29/503* (2015.01); *F21V 29/508* (2015.01);
(Continued)

(58) Field of Classification Search
CPC ......... G02F 1/1333; G02F 2001/13332; G02F 2001/133314; G02F 2001/133317; F21V 29/70
(Continued)

(56) References Cited

U.S. PATENT DOCUMENTS 7,553,060 B2 *  6/2009  Tanabe ................. G02B 6/0068
                                                        362/612
2004/0004424 A1  1/2004  Sakurai
(Continued)

FOREIGN PATENT DOCUMENTS

JP    2004-6193 A    1/2004
JP    2011-60619 A    3/2011
(Continued)

OTHER PUBLICATIONS

International Search Report issued in Application No. PCT/JP2018/007233, dated May 15, 2018 (2 pages).
(Continued)

*Primary Examiner* — Christopher M Raabe
(74) *Attorney, Agent, or Firm* — Osha Liang LLP

(57) ABSTRACT

A surface light source device includes a light source; a light guide plate that has a light entrance surface through which light enters, and that emits the light entering through the light entrance surface from a light exit surface; a wiring board; and a metal frame. The metal frame includes a bottom
(Continued)

portion having a bottom surface that faces a surface on an opposite side to the light exit surface, a side wall erected on an outer periphery of the bottom surface, and a projecting portion provided on the side wall so as to project toward the bottom surface side. The metal frame houses the light source, the light guide plate, and the wiring board. At least a part of the light source is disposed between the bottom portion and the projecting portion, and the wiring board is disposed between the light source and the bottom portion.

18 Claims, 15 Drawing Sheets

(51) Int. Cl.
| | | |
|---|---|---|
| *F21V 29/503* | (2015.01) | |
| *F21V 29/508* | (2015.01) | |
| *F21V 29/85* | (2015.01) | |
| *F21V 29/70* | (2015.01) | |
| *F21S 2/00* | (2016.01) | |

(52) U.S. Cl.
CPC .............. *F21V 29/70* (2015.01); *F21V 29/85* (2015.01); *G02F 1/1333* (2013.01); *F21S 2/00* (2013.01)

(58) Field of Classification Search
USPC .......................................................... 362/608
See application file for complete search history.

(56) References Cited

U.S. PATENT DOCUMENTS

| | | | |
|---|---|---|---|
| 2005/0141244 A1* | 6/2005 | Hamada | G02B 6/0068 362/612 |
| 2007/0211191 A1* | 9/2007 | Cho | G02B 6/0073 349/58 |
| 2011/0063543 A1 | 3/2011 | Ohashi et al. | |
| 2013/0038810 A1* | 2/2013 | Imaoku | G02F 1/133603 349/58 |
| 2013/0094245 A1 | 4/2013 | Kanda et al. | |
| 2014/0226080 A1* | 8/2014 | Tomomasa | G02B 6/0085 348/794 |
| 2015/0362791 A1 | 12/2015 | Kakuda et al. | |
| 2018/0120644 A1* | 5/2018 | Aeo | G02F 1/1336 |
| 2019/0302351 A1* | 10/2019 | Hayashi | G02B 6/002 |

FOREIGN PATENT DOCUMENTS

| | | |
|---|---|---|
| JP | 2014-149386 A | 8/2014 |
| JP | 2016-4782 A | 1/2016 |
| JP | 2016-81785 A | 5/2016 |
| WO | 2012/001998 A1 | 1/2012 |

OTHER PUBLICATIONS

Written Opinion issued in International Application No. PCT/JP2018/007233, dated May 15, 2018 (5 pages).

English translation of International Preliminary Report on Patentability for corresponding International Application No. PCT/JP2018/007233, dated Feb. 28, 2019 (6 pages).

* cited by examiner

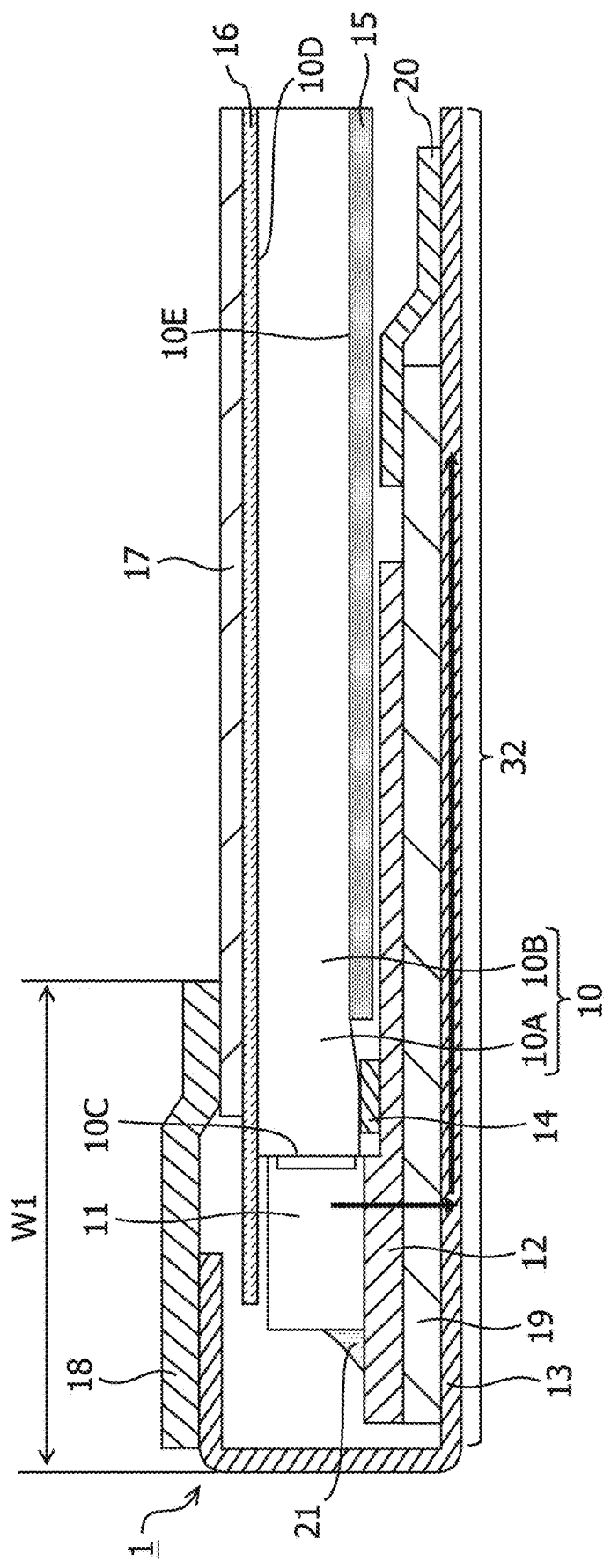

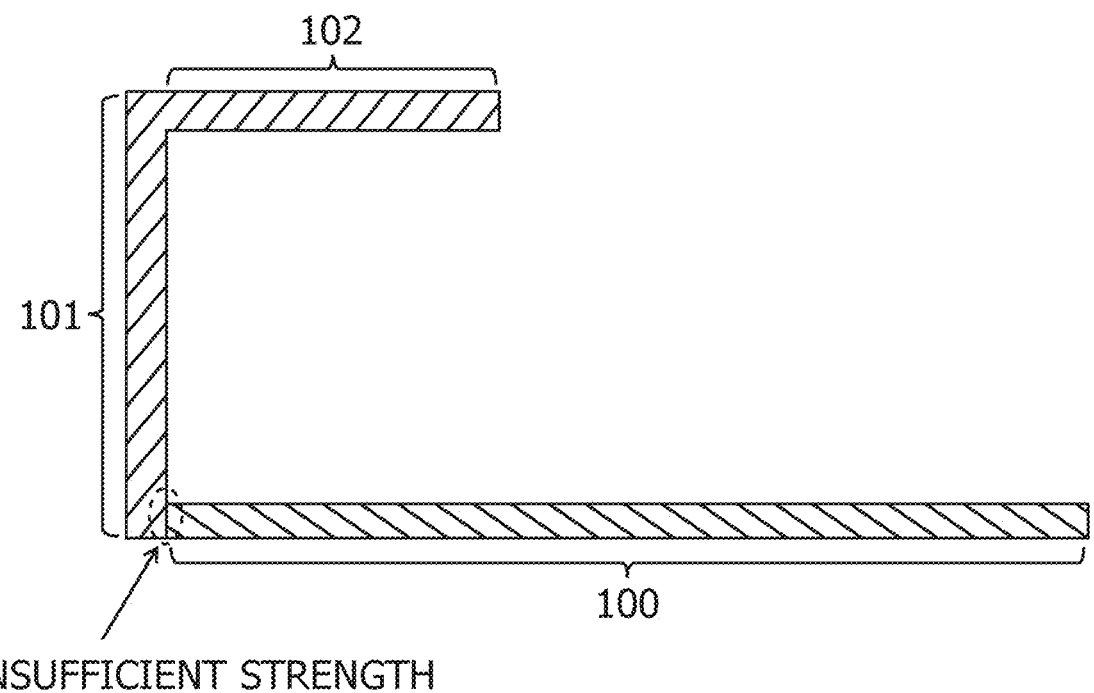

Fig.10

| | THICKNESS [mm] | TENSILE STRENGTH [N/mm²] | STRENGTH [N/mm²] | ELONGATION [%] | THERMAL CONDUCTIVITY [W/m·K] | NON-MAGNETISM | RELATIVE UNIT PRICE (EQUAL THICKNESS) |
|---|---|---|---|---|---|---|---|
| STAINLESS STEEL A | 0.1 | 780 | 510 | 6 | 16 | — | 100% |
| ALUMINUM B | 0.2 | 165 | 150 | 5 | 218 | ○ | 40% |
| ALUMINUM ALLOY C | 0.2 | 260 | 215 | 10 | 137 | ○ | 39% |
| ALUMINUM ALLOY D | 0.15 | 400 | 310 | 12 | 117 | ○ | 74% |
| ALUMINUM ALLOY E | 0.2 | 200 | 180 | 10 | 215 | ○ | 45% |
| ALUMINUM ALLOY F | 0.15 | 300 | 280 | 8 | 204 | ○ | 65% |

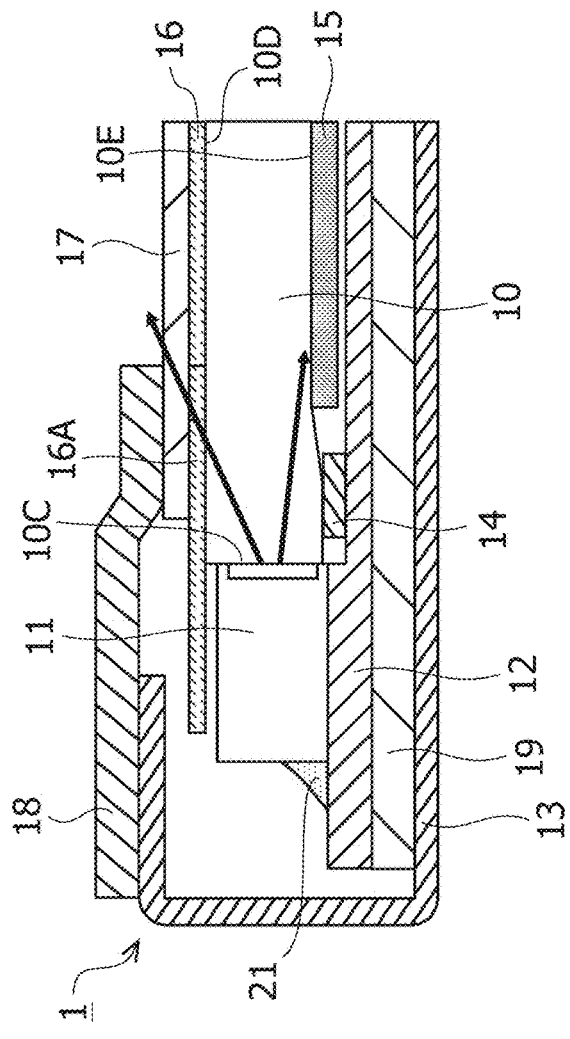
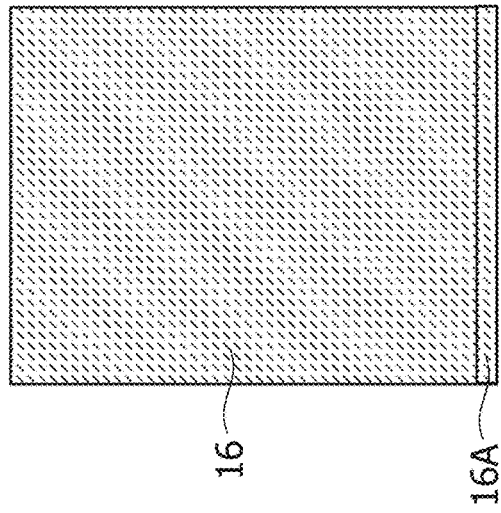
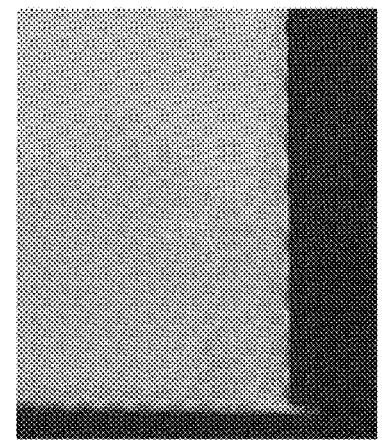
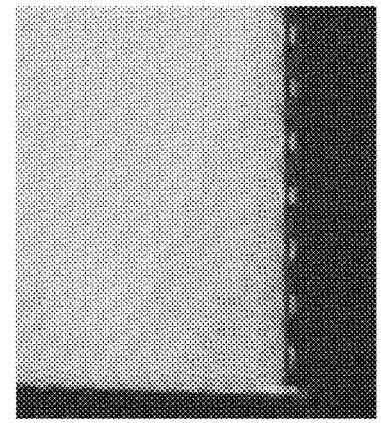
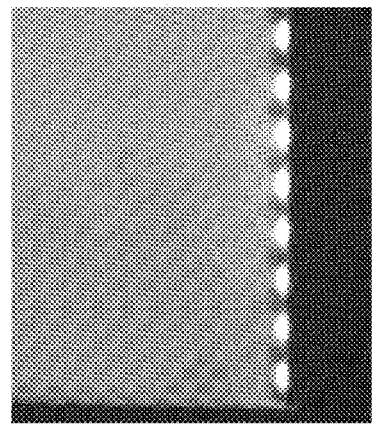
FIG.12A
FIG.12B
FIG.12E
FIG.12D
FIG.12C

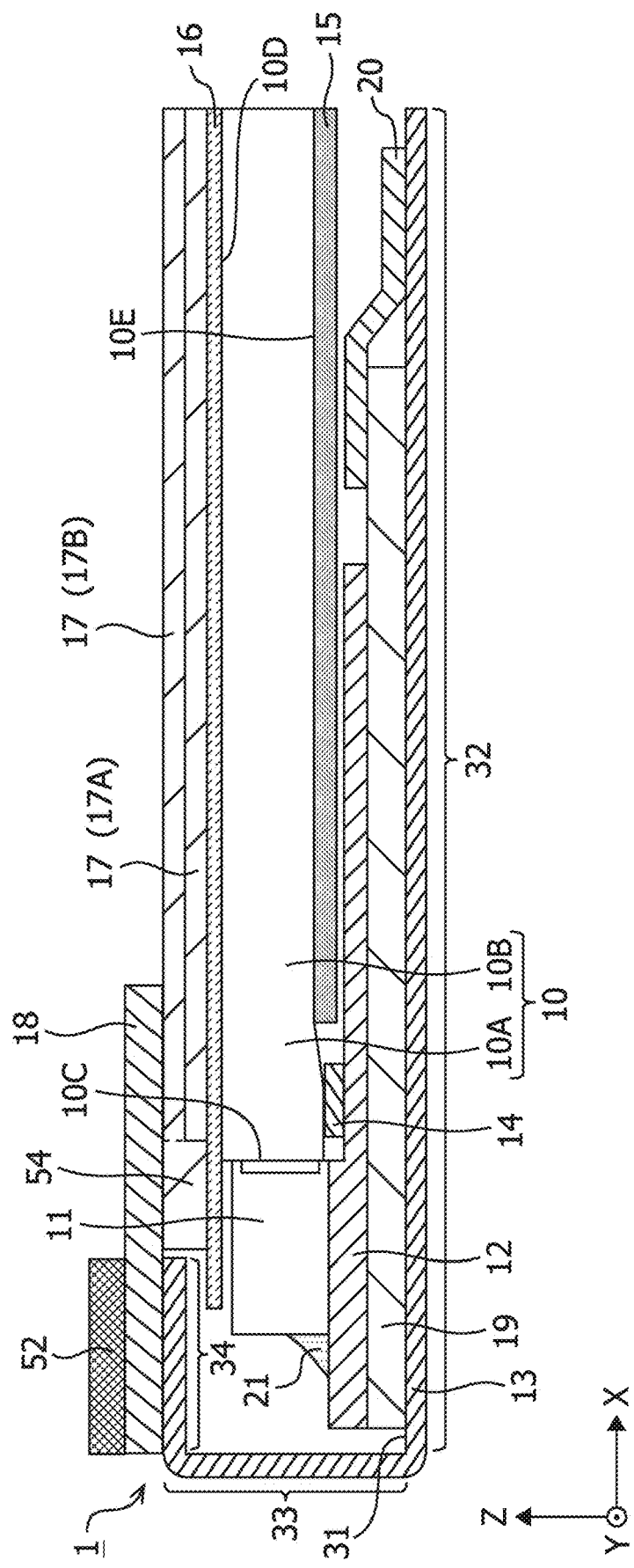

SURFACE LIGHT SOURCE DEVICE, DISPLAY DEVICE, AND ELECTRONIC DEVICE

TECHNICAL FIELD

The present invention relates to a surface light source device, a display device, and an electronic device.

BACKGROUND ART

In recent years, electronic devices have become smaller and thinner. There is therefore a need for liquid crystal display devices installed in such electronic devices to have slimmer borders in order to obtain a larger display area from the same surface area, and to become thinner. A side light type (also known as an edge light type) surface light source device having an LED (Light Emitting Diode) package that emits white light as a light source and employing a light guide plate (also known as a light guide), for example, is used as a backlight of a display panel. A heat-dissipating member, a lighting device, an electro-optical device, and an electronic device with which heat generated by an LED can be absorbed so that current flowing through the LED can be increased have been proposed in relation to this technology (see Patent document 1). A technique for diffusing heat so as to avoid excessive heat concentration in an electronic device by providing a heat diffusion layer made of graphite or the like in the electronic device has also been proposed (see Patent document 2).

CITATION LIST

Patent Document

[Patent document 1] Japanese Laid-open Patent Publication No. 2004-6193
[Patent document 2] Japanese Laid-open Patent Publication No. 2016-4782

SUMMARY OF INVENTION

Technical Problem

In a side light type surface t source device, a plurality of light sources are arranged on the side of the light guide plate. To achieve a slimmer border, the distance between the light source and a light-emitting area on a backlight unit is reduced, but when this distance is reduced, brightness unevenness, such as darkness between light sources and so on, occurs near the light sources in the light-emitting area. By reducing the pitch of the plurality of light sources arranged on the side of the light guide plate, brightness unevenness near the light sources in the light-emitting area is suppressed. When the pitch of the plurality of light sources arranged on the side of the light guide plate is reduced, however, heat from the light sources is less likely to dissipate, and as a result, thermal degradation occurs, leading to failure of a light source to light, a reduction in brightness, and unevenness in the brightness distribution.

In consideration of these circumstances, an object of the present invention is to provide a technique for improving the heat dissipation ability of a light source.

Means for Solving the Problems

In the present invention, the following means is adopted in order to solve the problem described above. Specifically, the present invention is a surface light source device including: a light source; a light guide plate that has, on a side thereof, a light entrance surface through which light emitted by the light source enters, and that emits the light entering through the light entrance surface from a light exit surface; a wiring board; and a metal frame that includes a bottom portion having a bottom surface that faces a surface on an opposite side to the light exit surface, a side wall erected on an outer periphery of the bottom surface, and a projecting portion provided on the side wall so as to project toward the bottom surface side, and that houses the light source, the light guide plate, and the wiring board, wherein at least a part of the light source is disposed between the bottom portion and the projecting portion, and the wiring board is disposed between the light source and the bottom portion.

With the surface light source device according to the present invention, by disposing at least a part of the light source between the bottom portion and the projecting portion, heat from the light source is transferred to the metal frame through the side wall and the bottom portion, and in addition, the heat from the light source is transferred to the metal frame through the projecting portion. As a result, an improvement in the heat dissipation ability of the light source can be achieved. Further, with the surface source device according to the present invention, by disposing the wiring board between the light source and the bottom portion, the heat of the light source can be transferred to the metal frame through the wiring board, and as a result, an improvement in the heat dissipation ability of the light source can be achieved.

The surface light source device according to the present invention may include a heat conduction member provided between the wiring board and the bottom portion, With the surface light source device according to the present invention, by providing the heat conduction member between the wiring board and the bottom portion, the heat of the light source can be transferred to the metal frame through the wiring board and the heat conduction member, and as a result, an improvement in the heat dissipation ability of the light source can be achieved.

In the surface light source device according to the present invention, the heat conduction member may be extended to between the light guide plate and the bottom portion. With the surface light source device according to the present invention, by extending the heat conduction member to between the light guide plate and the bottom portion, the surface area of the heat conduction member is enlarged. As a result, the heat dissipation ability of the heat conduction member improves, enabling an improvement in the heat dissipation ability of the light source.

The heat conduction member of the surface light source device according to the present invention may be a graphite sheet, thermally conductive tape, or a composite member constituted by a graphite sheet and thermally conductive tape. A graphite sheet exhibits a superior thermal conduction property in a horizontal direction and thereby diffuses heat in the horizontal direction. Accordingly, heat is diffused in the horizontal direction of the surface light source device, leading to an increase in the amount of heat transferred from the light source to the heat conduction member, and as a result, an improvement in the heat dissipation ability of the light source can be achieved. Thermally conductive tape exhibits a superior thermal conduction property in a vertical direction and thereby diffuses heat in the vertical direction. Accordingly, the amount of heat transferred from the light source to the metal frame through the heat conduction member increases, enabling an improvement in the heat dissipation ability of the light source.

In the surface source device according to the present invention, the wiring board may be extended to between the light guide plate and the bottom portion. With the surface light source device according to the present invention, by extending the wiring board to between the light guide plate and the bottom portion, the surface area of the wiring board is enlarged, and therefore the heat of the light source escapes to the metal frame through the wiring board more easily. As a result, air improvement in the heat dissipation ability of the light source can be achieved.

In the surface light source device according to the present invention, the side wall may have a first inner surface connected to the bottom surface, the projecting portion may have a second inner surface connected to the first inner surface, and the bottom surface, the first inner surface, and the second inner surface may be covered by an insulating member. By coveting the bottom surface, the first inner surface, and the second inner surface with an insulating member, short-circuiting of solder connecting the light source to the wiring board, which occurs when the solder contacts the metal frame, can be avoided.

In the surface source device according to the present invention, the bottom portion may have a through hole that penetrates the bottom portion or a recessed portion recessed from a surface on an opposite side to the bottom surface toward the bottom surface. By providing the bottom portion with a through hole or a recessed portion, the surface area of the metal frame can be enlarged, and as a result, the heat dissipation ability of the metal frame can be improved, leading to an improvement in the heat dissipation ability of the light source.

In the surface light source device according to the present invention, the metal frame may be formed from aluminum, aluminum alloy, or stainless steel. In the surface light source device according to the present invention, a thermal conductivity of the metal frame may be 130 W/m·K. In the surface light source device according to the present invention, a strength of the metal frame may be 260 N/mm$^2$ or more.

The surface source device according to the present invention may include a diffusion sheet provided on the light exit surface, a prism sheet provided on the diffusion sheet, light-blocking tape provided on the projecting portion and the prism sheet, and a buffer member provided on the light-blocking tape, and at least a part of the projecting portion and at least a part of the buffer member may overlap in a normal direction of the bottom surface. The surface light source device according to the present invention may also include a spacer housed in the metal frame and disposed adjacent to the projecting portion in a direction opposing to the side wall. The surface light source device according to the present invention may include a diffusion sheet provided on the light exit surface, a prism sheet provided on the diffusion sheet, and light-blocking tape provided on the projecting portion, the spacer, and the prism sheet, and the spacer may be disposed between the projecting portion and the prism sheet in the direction opposing to the side wall and fixed to the light-blocking tape.

The surface light source device according to the present invention may include a diffusion sheet provided on the light exit surface and a prism sheet provided on the diffusion sheet, and the spacer may be disposed between the projecting portion and the prism sheet in the direction opposing to the side wall and fixed to the diffusion sheet. The surface light source device according to the present invention may include a diffusion sheet provided on the light exit surface, a prism sheet provided on the diffusion sheet, light-blocking tape provided on the projecting portion and the prism sheet, and a buffer member provided on the light-blocking tape, and at least a part of the projecting portion and at least a part of the buffer member may overlap in the normal direction of the bottom surface. In the surface light source device according to the present invention, the spacer may have a light-blocking property.

A display device according to the present invention includes the surface light source device according to the present invention, and a display panel that receives light emitted from the surface light source device. Since the display device includes the surface light source device according to the present invention, a display device having a light source with an improved heat dissipation ability can be provided.

An electronic device according to the present invention includes the display device according to the present invention. Since the electronic device includes the surface light source device and the display device according to the present invention, an electronic device having a light source with an improved heat dissipation ability can be provided.

Advantageous Effects of Invention

According to the present invention, the heat dissipation ability of a light source can be improved.

BRIEF DESCRIPTION OF DRAWINGS

FIG. 2 is a sectional view of a surface light source device according to the embodiment.

FIG. 4 is a sectional view of sheet metal according to a comparative example.

FIG. 10 is a view showing properties of metal materials.

FIG. 12A is a plan view of a diffusion sheet according to the embodiment.

FIG. 12B is a sectional view of the surface light source device according to the embodiment.

FIG. 12C shows an example of the surface light source device when seen from an upper surface side.

FIG. 12D shows an example of the surface light source device when seen from the upper surface side.

FIG. 12E shows an example of the surface light source device when seen from the upper surface side.

FIG. 15 is a sectional view of the surface light source device according to the embodiment.

DESCRIPTION OF EMBODIMENTS

Figure 1:
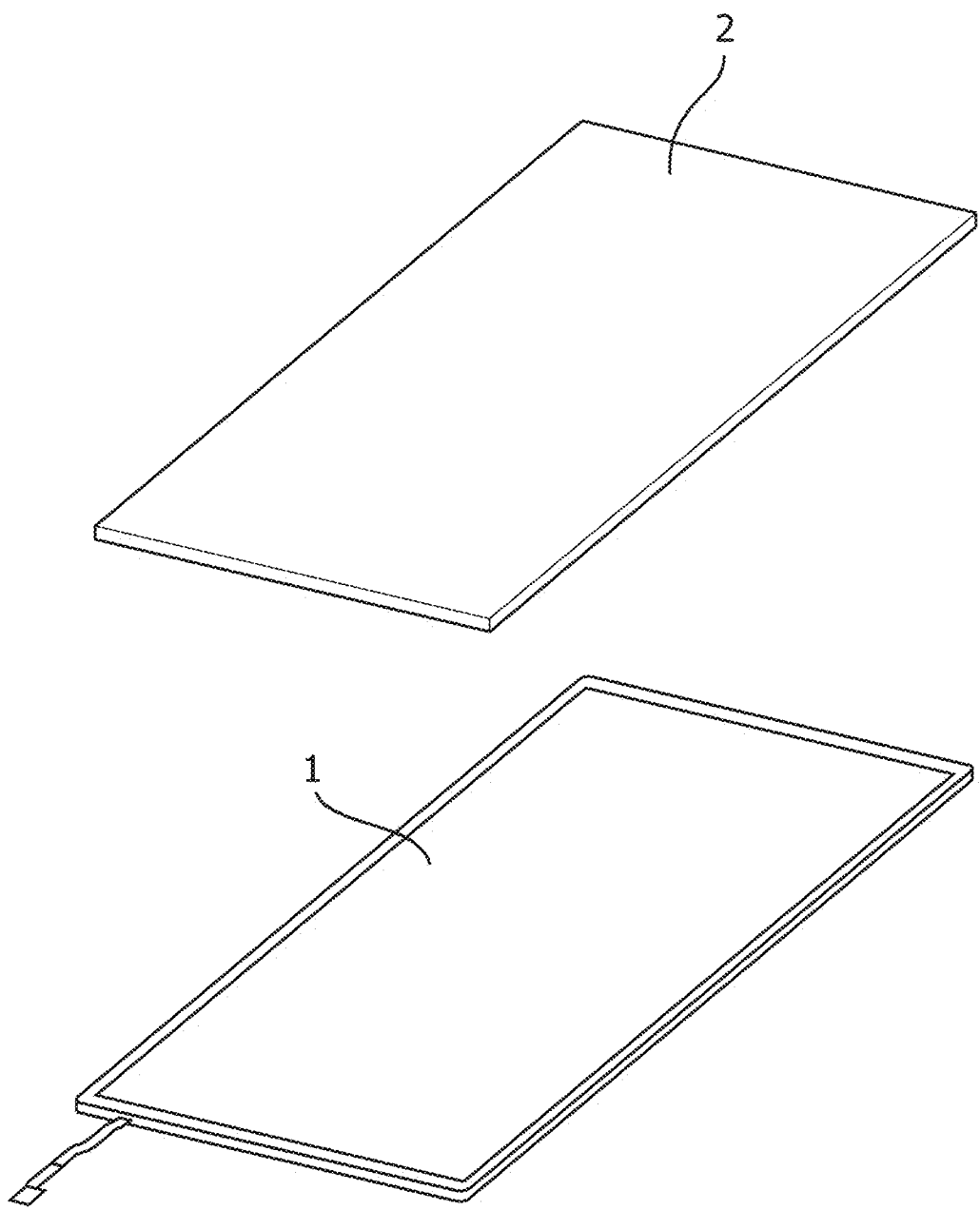
FIG. 1 is a perspective view showing an example configuration of a liquid crystal display device according to an embodiment.

An embodiment of the present invention will be described below on the basis of the drawings. Note that the embodiment described below is an example embodiment of the present invention, and the present invention is not limited to the specific configurations described below.

In the following embodiment, the "display device" is described as a liquid crystal display device, and the "surface light source device" is described as a backlight for a liquid crystal display device. Note that the "surface light source device" may be used in an application other than a backlight, such as a front light arranged on a front surface of a display panel or a display device constituted by electronic paper.

Referring to the drawings, the liquid crystal display device according to the embodiment will be described.
(Configuration of Liquid Crystal Display Device)

FIG. 1 is a perspective view showing an example configuration of the liquid crystal display device according to the embodiment. As shown in FIG. 1, the liquid crystal display device includes a surface light source device 1 disposed as a backlight, and a display panel 2 for receiving light emitted from the surface light source device 1. The display panel 2 is caused to display an image by applying a voltage to liquid crystal sandwiched and sealed between glass plates and adjusting the light transmittance and so on. Hereafter, the display panel 2 side of the surface light source device 1 may be referred to as an upper surface side, and the opposite surface side thereto may be referred to as a lower surface side.

FIG. 2 is a sectional view of the surface light source device 1 according to the embodiment. The surface light source device 1 includes a light guide plate 10, a light source 11, a flexible printed circuit (abbreviated to "FPC" hereafter) 12, a sheet metal frame 13, FPC fixing tape 14, a reflective sheet 15, a diffusion sheet 16, a prism sheet 17, light-blocking double-sided tape 18, a heat conduction member 19, and fixing tape 20.

The light guide plate 10 is formed in a substantially flat plate shape from a translucent material such as polycarbonate resin or polymethyl methacrylate resin. The light guide plate 10 includes a light introduction portion 10A and a light guide plate main body 10B, the light introduction portion 10A being formed integrally with an end portion of the light guide plate main body 10B. The light introduction portion 10A includes a light entrance surface 10C through which light enters. The light entrance surface 10C is provided on the side of the light introduction portion 10A. The light entrance surface 10C thus forms a part of the side face of the light guide plate 10. The light guide plate 10 includes a light exit surface 10D through which light entering through the light entrance surface 10C exits, and the light exit surface 10D faces the display panel 2. Hereafter, the light exit surface 10D of the light guide plate 10 is assumed to be an upper surface of the light guide plate 10, and a surface 10E on the opposite side of the light guide plate 10 to the light exit surface 10D is assumed to be a lower surface of the light guide plate 10.

The light guide plate main body 10B is thinner than a maximum thickness of the light introduction portion 10A and is connected to the light introduction portion 10A. The light introduction portion 10A has an inclined surface that inclines toward the light guide plate main body 10B. The height of the end portion of the light introduction portion 10A is either equal to or higher than the height of a light exit window of the light source 11. As a result, light emitted from the light source 11 enters the light guide plate main body 10B through the light entrance surface 10C of the light guide plate 10 efficiently, leading to an improvement in the light use efficiency of the light guide plate 10. Further, the light guide plate main body 10B is thinner than the light introduction portion 10A. As a result, the thickness of the surface light source device 1 can be reduced, leading to a reduction in the thickness of the liquid crystal display device including the surface light source device 1. Note, however, that the embodiment is not limited to the shape of the light guide plate 10 shown in FIG. 2, and the light guide plate 10 according to the embodiment may take a flat plate shape not including the light introduction portion 10A.

The light source 11 emits white light from a fluorescent portion. The light source 11 is an LED package, for example, but a light source other than an LED package may be used. The light source 11 is formed by sealing an LED chip serving as a light-emitting element in translucent resin (a resin layer) containing fluorescent material. The light source 11 is driven to light up by a supply of power received from the FPC 12. The light source 11 serves as an example of a heat source. Note that an LED light source other than a white light source may be used as the light source 11. The light source 11 is disposed on the FPC 12 so that a light-emitting surface of the light source 11 faces the light entrance surface 10C of the light guide plate 10. For example, a plurality of light sources 11 are mounted on the FPC 12 in a line at fixed intervals.

The FPC 12 is a wiring board formed by providing wiring on a base material, the base material being constituted by a flexible insulating film, using conductive foil and adhering a cover lay or resin (light-sensitive resin), the cover lay or resin serving as a protective insulating film, to the surface thereof. The light sources 11 are arranged on an upper surface of the FPC 12, and the wiring is provided on the upper surface of the FPC 12. The upper surface of the FPC 12 is oriented in the same direction as the upper surface of the light guide plate 10. The upper surface of the FPC 12 is the upper surface of the base material forming the FPC 12. The wiring on the upper surface of the FPC 12 is used to supply power to the light sources 11 and so on. Wiring is not limited to being provided on the upper surface of the FPC 12. Wiring may also be provided on a lower surface of the FPC 12. The lower surface of the FPC 12 is the lower surface of the base material forming the FPC 12. The wiring on the upper surface of the FPC 12 and the wiring on the lower surface of the FPC 12 may be connected by a through hole (also referred to as a TSV) penetrating the FPC 12, and the wiring on the lower surface of the FPC 12 may be connected to the same wiring or other wiring on the upper surface of the FPC 12 by another through hole. By connecting the wiring on the upper surface of the FPC 12 and the wiring on the lower surface of the FPC 12 through a through hole, heat generated by the light sources 11 can be transferred to the lower surface of the FPC 12 more easily. Wiring may also be provided in the interior of the FPC 12, and a through hole may be connected to the wiring in the interior of the FPC 12. Moreover, a plurality of through holes may be connected to each other via the wiring in the interior of the FPC 12. In this case, one end of the through hole may stop in the interior of the FPC 12 instead of penetrating the FPC 12. The light sources 11 are soldered to the wiring on the upper surface of the FPC 12 so that the light sources 11 and the FPC 12 are electrically connected. A solder fillet 21 formed to solder the light source 11 to the FPC 12 is provided on a side face of the light source 11.

Dummy wiring may be provided on the upper and lower surfaces of the FPC 12. Dummy wiring is wiring not used to supply power to the light sources 11 and so on. The dummy wiring on the upper surface of the FPC 12 and the dummy wring on the lower surface of the FPC 12 are connected by a through hole penetrating the FPC 12. By connecting the dummy wiring on the upper surface of the FPC 12 and the dummy wring on the lower surface of the FPC 12 through a through hole, the heat generated by the light sources 11 can be transferred to the lower surface of the FPC 12 more easily. Further, the dummy wiring on the upper surface of the FPC 12 and the dummy wring on the lower surface of the FPC 12 may be connected by a through hole, and the dummy wiring on the lower surface of the FPC 12 may be connected to the same dummy wiring or other dummy wiring on the upper surface of the FPC 12 by another through hole. Although not shown in FIG. 2, a part of the FPC 12 projects toward the outside of the surface light source device 1 through an opening provided in the sheet metal frame 13.

The sheet metal frame 13 houses the light guide plate 10, the light sources 11, the FPC 12, the FPC fixing tape 14, the reflective sheet 15, the diffusion sheet 16, the prism sheet 17, the heat conduction member 19, and the fixing tape 20. The sheet metal frame 13 has a thermal conduction property and is formed from aluminum, aluminum alloy, stainless steel, or the like, for example. The sheet metal frame 13 serves as an example of a metal frame.

Figure 3A:
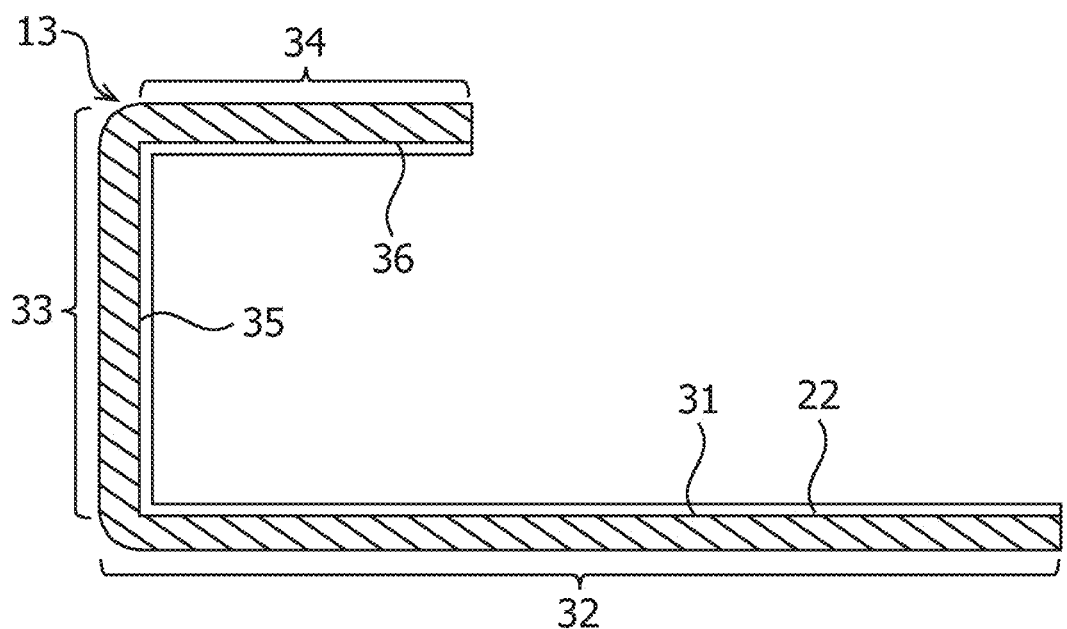
FIG. 3A is a sectional view of a sheet metal frame according to the embodiment.

FIG. 3A is a sectional view of the sheet metal frame 13 according to the embodiment. The sheet metal frame 13 includes a bottom portion 32 having a bottom surface 31, a side wall 33 erected on a part of the outer periphery of the bottom surface 31, and a top portion 34 provided on the side wall 33 so as to project toward the bottom surface 31 side. The bottom portion 32 has a rectangular shape when seen from above in a normal direction of the bottom surface 31, and the side wall 33 is erected on one side of the bottom portion 32 so as to extend in the normal direction of the bottom surface 31. The light sources 11 are arranged between the bottom portion 32 and the top portion 34. A part of the light source 11 may be arranged between the bottom portion 32 and the top portion 34, or a whole of the light source 11 may be arranged between the bottom portion 32 and the top portion 34. Heat from the light sources 11 is transferred to the sheet metal plate 13 through the top portion 34, leading to an improvement in the heat dissipation ability of the light sources 11. The top portion 34 serves as an example of a projecting portion.

Figure 3B:
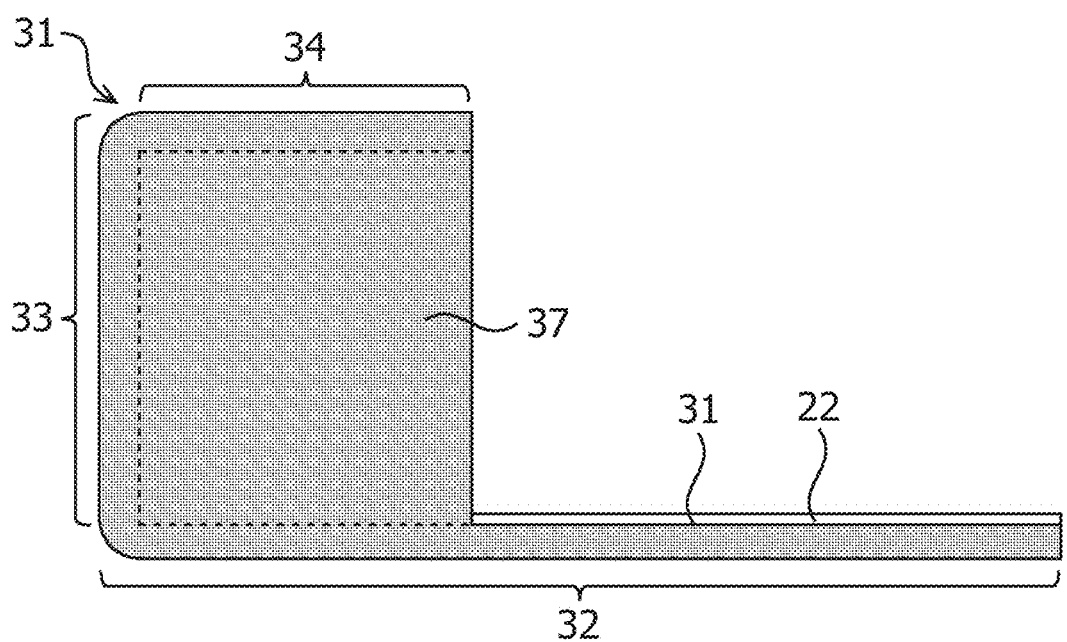
FIG. 3B is a side view of the sheet metal frame according to the embodiment.

In the example configuration of the sheet metal plate 13 shown in FIG. 3A, the top portion 34 is bent at a right angle to the side wall 33 so as to be parallel to the bottom portion 32, but the embodiment is not limited to the example configuration of the sheet metal plate 13 shown in FIG. 3A. The top portion 34 may be curved so as not to be parallel to the bottom portion 32. FIG. 3B is a side view of the sheet metal frame 13 according to the embodiment. A side wall 37 connected to the bottom portion 32, the side wall 33, and the top portion 34 is provided on a side face of the sheet metal frame 13. The heat transferred to the top portion 34 from the light sources 11 is transferred to the bottom portion 32 through the side walls 33 and 37 so as to be dissipated to the outside while spreading through the entire sheet metal frame 13. Note that the side wall 37 may be omitted from the sheet metal frame 13.

The side wall 33 has an inner surface 35 connected to the bottom surface 31, and the top portion 34 has an inner surface 36 connected to the inner surface 35. The inner surface 35 serves as an example of a first inner surface. The inner surface 36 serves as an example of a second inner surface. As shown in FIGS. 3A and 3B, the bottom surface 31 and the inner surfaces 35 and 36 may be covered by an insulating member 22. Accordingly, the bottom surface 31 and the inner surfaces 35 and 36 may be coated with an insulation coating. By covering the bottom surface 31 and the inner surfaces 35 and 36 with the insulating member 22, short-circuiting of the solder fillet 21, which occurs when the solder fillet 21 contacts the sheet metal frame 13, can be avoided. The insulating member 22 has a thermal conduction property. Heat from the light sources 11 is transferred to the bottom portion 32 and the top portion 34 through the insulating member 22. The insulating member 22 may cover the bottom surface 31 and the inner surfaces 35 and 36 entirely, or the insulating member 22 may cover the bottom surface 31 and the inner surfaces 35 and 36 partially in the vicinity of the solder fillet 21. The insulating member 22 may also be omitted. In this case, short-circuiting of the solder fillet 21 may be avoided by ensuring that the distances between the sheet metal frame 13 and the solder fillet 21 are sufficiently large and so on.

FIG. 4 is a sectional view of sheet metal 100 according to a comparative example. As shown in FIG. 4, when the sheet metal 100 is provided with a side wall 101 and a top portion 102 formed from resin, the surface area of the sheet metal 100 relative to the light sources 11 is small. In the sheet metal frame 13 according to the embodiment, on the other hand, the bottom portion 32, the side wall 33, and the top portion 34 are integrated, and therefore the surface area of the sheet metal frame 13 relative to the light sources 11 is greater than the surface area of the sheet metal 100 according to the comparative example. As a result, an improvement is achieved in the heat dissipation ability of the sheet metal frame 13 according to the embodiment. Further, when the sheet metal 100 is provided with the side wall 101 and the top portion 102 formed from resin, as shown in FIG. 4, the strength of a contact part between the sheet metal 100 and the side wall 101 is insufficient. In the sheet metal frame 13 according to the embodiment, the bottom portion 32, the side wall 33, and the top portion 34 are integrated, and therefore an improvement is achieved in the strength of a boundary part between the bottom portion 32 and the side wall 33.

Figure 5:
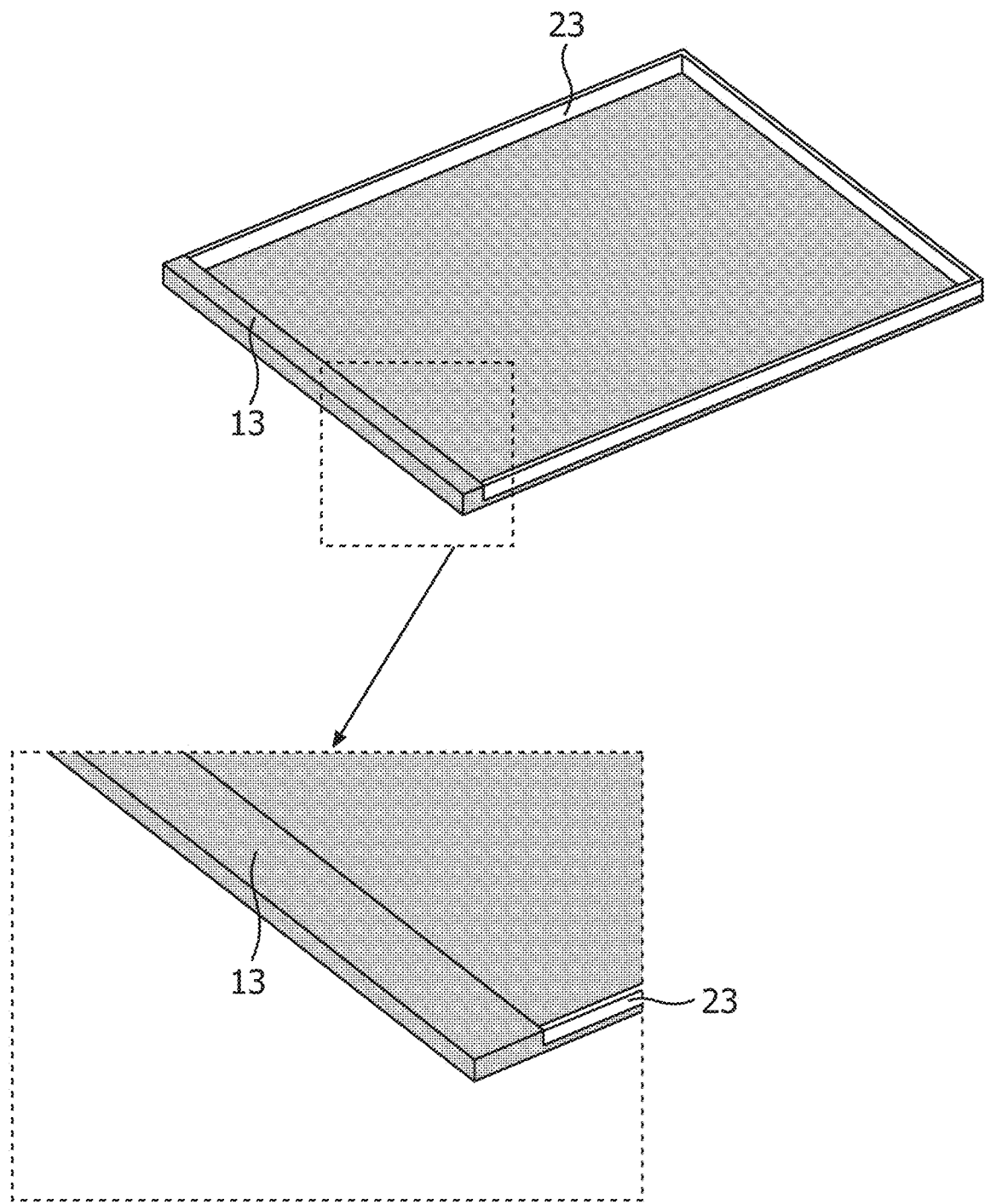
FIG. 5 is a perspective view of the sheet metal frame according to the embodiment.

FIG. 5 is a perspective view of the sheet metal frame 13 according to the embodiment. A resin frame 23 is provided on an outer peripheral part of the sheet metal frame 13. More specifically, the resin frame 23 is erected on three sides of the bottom portion 32 so as to extend in the normal direction of the bottom surface 31. The resin frame 23 is formed from polycarbonate resin containing titanium oxide, polycarbonate resin not containing titanium oxide, or the like. The resin frame 23 surrounds the side faces of the light guide plate 10 other than the light entrance surface 10C. The resin frame 23 has high reflectance and reflects light leaking from the side faces of the light guide plate 10 for reuse.

Returning to FIG. 2, the FPC fixing tape 14 contacts the light introduction portion 10A of the light guide plate 10 so as to fix the light guide plate 10 to the FPC 12. The reflective sheet 15 is disposed in contact with the lower surface of the light guide plate 10. The reflective sheet 15 is a smooth sheet constituted by a highly reflective film having a multilayer film structure, a high-reflectance white resin sheet, metal foil, or the like, and reflects the light in the light guide plate 10 so that no light leaks out from the lower surface of the surface light source device 1.

The diffusion sheet 16 and one or two prism sheets 17 are disposed on the light guide plate 10. The diffusion sheet 16 is a semi-transparent resin film that diffuses the light exiting through the light exit surface 10D of the light guide plate main body 10B so as to widen the directional characteristic of the light. The prism sheet 17 is a transparent resin film with a triangular prism-shaped fine pattern formed on the upper surface thereof. The prism sheet 17 condenses the light diffused by the diffusion sheet 16 in order to increase the brightness when the surface light source device 1 is seen from the upper surface side. The light-blocking double-sided tape 18 is black adhesive tape having adhesive surfaces on both the upper and lower surfaces thereof. The light-blocking double-sided tape 18 is border-shaped (ring-shaped). The light-blocking double-sided tape 18 is disposed around the outer peripheral part of the sheet metal frame 13 to suppress light leakage to the outside of the surface light source device 1. The fixing tape 20 fixes the heat conduction member 19 to the sheet metal frame 13.

The FPC 12 is disposed between the light sources 11 and the bottom portion 32. A part of the upper surface of the FPC 12 contacts the light sources 11, while the lower surface of the FPC 12 contacts the heat conduction member 19. The heat conduction member 19 has a thermal conduction property. The heat conduction member 19 is a graphite sheet or thermally conductive double-sided tape. Heat from the light sources 11 is transferred to the bottom portion 32 through the FPC 12 and the heat conduction member 19, and as a result, the heat is dissipated to the outside while spreading through the entire sheet metal frame 13. Thick arrows in FIG. 2 show an example of the movement directions of the heat transferred to the sheet metal frame 13 from the light sources 11.

The heat conduction member 19 may also be a composite member constituted by a graphite sheet and thermally conductive double-sided tape. For example, a central part of the heat conduction member 19 may be a graphite sheet, and an outer peripheral part of the heat conduction member 19 may be thermally conductive double-sided tape. The heat conduction member 19 may also be a laminated member formed by laminating a graphite sheet and thermally conductive double-sided tape, for example. In this case, the graphite sheet of the heat conduction member 19 may contact the lower surface of the FPC 12 and the thermally conductive double-sided tape of the heat conduction member 19 may contact the bottom portion 32. Alternatively, the double-sided tape of the heat conduction member 19 may contact the lower surface of the FPC 12 and the graphite sheet of the heat conduction member 19 may contact the bottom portion 32.

In the example configuration of the surface light source device 1 shown in FIG. 2, the heat conduction member 19 is provided between the FPC 12 and the bottom portion 32, but the embodiment is not limited to the example configuration of the surface light source device 1 shown in FIG. 2, and the heat conduction member 19 does not have to be provided between the FPC 12 and the bottom portion 32. In this case, the lower surface of the FPC 12 contacts the bottom portion 32. When the lower surface of the FPC 12 contacts the bottom portion 32, the heat from the light sources 11 is transferred to the bottom portion 32 through the FPC 12, and as a result, the heat is dissipated to the outside while spreading through the entire sheet metal frame 13.

Figure 6:
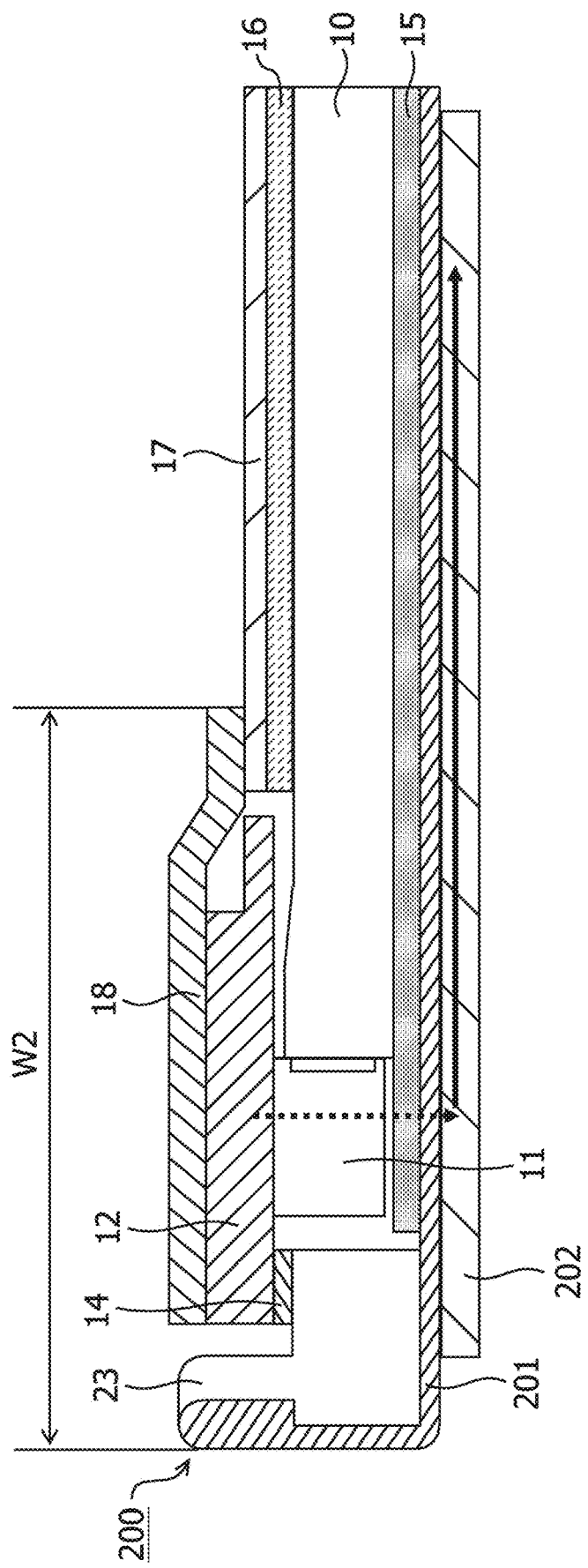
FIG. 6 is a sectional view of a surface lit source device according to a comparative example.

FIG. 6 is a sectional view of a surface light source device 200 according to a comparative example. In the surface light source device 200 according to the comparative example, the FPC 12 is provided on the light sources 11, and the heat conduction member 19 is not provided on a sheet metal frame 201. In the surface light source device 200 according to the comparative example, therefore, an air layer is formed between the FPC 12 and the sheet metal frame 201. Accordingly, in the surface light source device 200 according to the comparative example, the heat transferred to the FPC 12 from the light sources 11 is transferred to the sheet metal frame 201 through the air layer, and therefore the heat dissipation ability of the light sources 11 is poor. Thick arrows in FIG. 6 show an example of the movement directions of the heat transferred to the sheet metal frame 201 from the FPC 12. Furthermore, in the surface light source device 200 according to the comparative example, a graphite sheet 202 is adhered to an outside surface of the sheet metal frame 201.

In the surface light source device 1 according to the embodiment, on the other hand, the FPC 12 is disposed between the light sources 11 and the bottom portion 32, and an air layer is not formed between the FPC 12 and the bottom portion 32. Therefore, the heat from the light sources 11 can be transferred to the sheet metal frame 13 easily, leading to an improvement in the heat dissipation ability of the light sources 11. Moreover, in the surface light source device 1 according to the embodiment, the heat conduction member 19 is built into the surface light source device 1, enabling a reduction in the thickness of the surface light source device 1 and simplification of the shape of the surface light source device 1, with the result that the surface light source device 1 can be manufactured more easily.

Furthermore, in the surface light source device 200 according to the comparative example, the FPC 12 is disposed on the light sources 11, and therefore, when the length of the FPC 12 is extended to the light guide plate 10 side, the FPC 12 juts out from the light-blocking double-sided tape 18. It is therefore necessary to keep the length of the FPC 12 within a border width W2 of the surface light source device 200. Hence, in the surface light source device 200 according to the comparative example, the length of the FPC 12 is dependent on the border width W2 of the surface light source device 200, and as a result, the length of the FPC 12 cannot be increased.

In the surface light source device 1 according to the embodiment, on the other hand, the FPC 12 is disposed between the light sources 11 and the bottom portion 32, as shown in FIG. 2, and therefore the length of the FPC 12 is not dependent on a border width W1 of the surface light source device 1. Hence, in the surface light source device 1 according to the embodiment, the length of the FPC 12 can be extended to the light guide plate 10 side. By extending the length of the FPC 12, the surface area of the FPC 12 increases such that the heat of the light sources 11 escapes through the FPC 12 to the sheet metal frame 13 more easily, and as a result, the heat dissipation ability of the light sources 11 improves. In the surface light source device 1 according to the embodiment, the length of the FPC 12 can be set as desired. The FPC 12 may be extended to between the light guide plate 10 and the bottom portion 32, and the dummy wiring provided on the lower surface of the FPC 12 may also be extended to between the light guide plate 10 and the bottom portion 32. Note, however, that the embodiment is not limited to the example configuration of the surface light source device 1 shown in FIG. 2, and the FPC 12 does not have to be extended to between the light guide plate 10 and the bottom portion 32. In FIG. 2, the FPC 12 has a thick part and a thin part, and the thin part of the FPC 12 is extended to between the light guide plate 10 and the bottom portion 32. However, the embodiment is not limited to the shape of the FPC 12 shown in FIG. 2, and the FPC 12 according to the embodiment may be flat plate-shaped.

A graphite sheet exhibits a superior thermal conduction property in a horizontal direction (the direction in which the graphite layer extends and thereby diffuses heat in the horizontal direction. By employing a graphite sheet as the heat conduction member 19, heat is diffused in the horizontal direction of the surface light source device 1, leading to an increase in the amount of heat transferred from the light sources 11 to the heat conduction member 19, and as a result, the heat dissipation ability of the light sources 11 improves. The horizontal direction of the surface h source device 1 is an orthogonal direction to a normal direction of the light exit surface 10D of the light guide plate main body 10B.

Thermally conductive double-sided tape exhibits a superior thermal conduction property in a vertical direction and thereby diffuses heat in the vertical direction. By employing thermally conductive double-sided tape as the heat conduction member 19, the amount of heat transferred from the light sources 11 to the sheet metal frame 13 through the heat conduction member 19 increases, and as a result, the heat dissipation ability of the light sources 11 improves. Further, by employing thermally conductive double-sided tape as the heat conduction member 19, the FPC 12 can be fixed to the sheet metal frame 13, and therefore the fixing tape 20 can be omitted. Furthermore, thermally conductive single-sided tape may be employed as the heat conduction member 19 instead of thermally conductive double-sided tape. Thermally conductive single-sided tape exhibits a superior thermal conduction property in the vertical direction and thereby diffuses heat in the vertical direction. Thermally conductive double-sided tape and thermally conductive single-sided tape serve as examples of thermally conductive tape.

The length of the heat conduction member 19 may be set as desired. The heat conduction member 19 may be extended to between the light guide plate 10 and the bottom portion 32. By extending the heat conduction member 19 to between the light guide plate 10 and the bottom portion 32, the surface area of the heat conduction member 19 increases. As a result, the heat dissipation ability of the heat conduction member 19 improves, leading to a further improvement in the heat dissipation ability of the light sources 11. When a graphite sheet, for example, is used as the heat conduction member 19, the amount of heat diffused in the horizontal direction of the surface light source device 1 increases, leading to a further increase in the amount of heat transferred from the light sources 11 to the heat conduction member 19, and as a result, the heat dissipation ability of the light sources 11 improves. When thermally conductive double-sided tape, for example, is used as the heat conduction member 19, the amount of heat transferred from the light sources 11 to the sheet metal frame 13 through the heat conduction member 19 increases even further, leading to a further improvement in the heat dissipation ability of the light sources 11. Note, however, that the embodiment is not limited to the example configuration of the surface light source device 1 shown in FIG. 2, and the heat conduction member 19 does not have to be extended to between the light guide plate 10 and the bottom portion 32.

Figure 7:
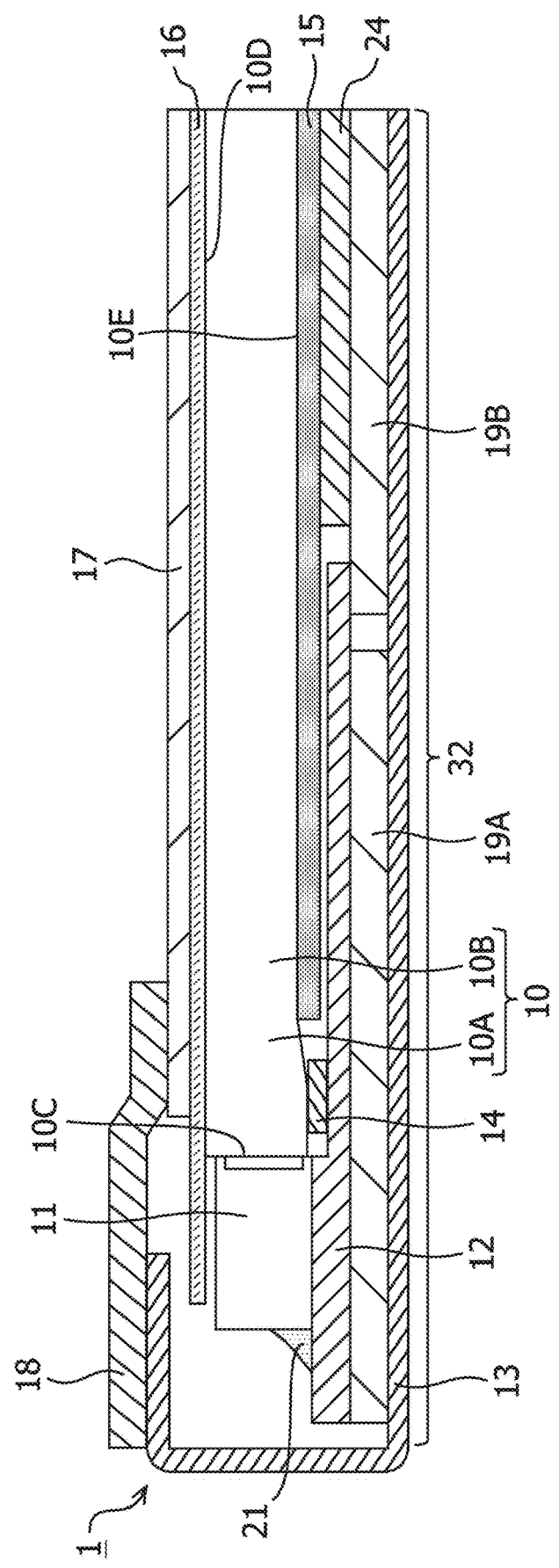
FIG. 7 is a sectional view of the surface light source device according to the embodiment.

Moreover, as shown in FIG. 7, a heat conduction member 19A may be disposed between the FPC 12 and the bottom portion 32, and a heat conduction member 19B may be disposed between the light guide plate 10 and the bottom portion 32. FIG. 7 is a sectional view of the surface light source device 1 according to the embodiment. The heat conduction member 19A is a graphite sheet, thermally conductive double-sided tape, or a composite member constituted by a graphite sheet and thermally conductive double-sided tape. The heat conduction member 19B is a graphite sheet, thermally conductive double-sided tape, or a composite member constituted by a graphite sheet and thermally conductive double-sided tape. Although not shown in FIG. 7, the heat conduction members 19A, 19B may be fixed to the sheet metal frame 13 by the fixing tape 20. An end portion of the heat conduction member 19A may contact an end portion of the heat conduction member 19B, or the respective end portions of the heat conduction member 19A and the heat conduction member 19B may be separated from each other. The heat conduction member 19A serves as an example of a first heat conduction member. The heat conduction member 19B serves as an example of a second heat conduction member.

As shown in FIG. 7, a support member 24 may be provided between the reflective sheet 15 and the heat conduction member 19B. The support member 24 is double-sided tape or cushioning material. When double-sided tape is used as the support member 24, the support member 24 fixes the reflective sheet 15 and the heat conduction member 19. An adhesive may be formed on both surfaces of the cushioning material, and the reflective sheet 15 and heat conduction member 19 may be fixed by the adhesive formed on the cushioning material. The cushioning material is a sheet-form buffer member. By employing cushioning material as the support member 24, stress applied to the light guide plate 10 and the reflective sheet 15 when external force is exerted on the surface light source device 1 is absorbed by the support member 24. As a result, the stress applied to the light guide plate 10 and the reflective sheet 15 is lightened, thereby preventing the light guide plate 10 and the reflective sheet 15 from breaking.

As shown in FIG. 7, the FPC 12 may be extended to between the light guide plate 10 and the bottom portion 32. The heat conduction member 19A may also be extended to between the light guide plate 10 and the bottom portion 32. The FPC 12 may also be extended to between the light guide plate 10 and the heat conduction member 19B. In a case where the FPC 12 is extended to between the light guide plate 10 and the heat conduction member 19B, the FPC 12 may contact the heat conduction member 19B or the FPC 12 and the heat conduction member 19B may be separated from each other.

A graphite sheet is preferably used as the heat conduction member 19B. By employing a graphite sheet as the heat conduction member 19B, heat can be diffused in a longitudinal direction of the surface light source device 1. Accordingly, heat transferred from the sheet metal frame 13 to the heat conduction member 19B can be diffused in the horizontal direction of the surface light source device 1. Furthermore, when the FPC 12 contacts the heat conduction member 19B, heat transferred from the FPC 12 to the heat conduction member 19B can be diffused in the horizontal direction of the surface light source device 1.

Figure 8A:
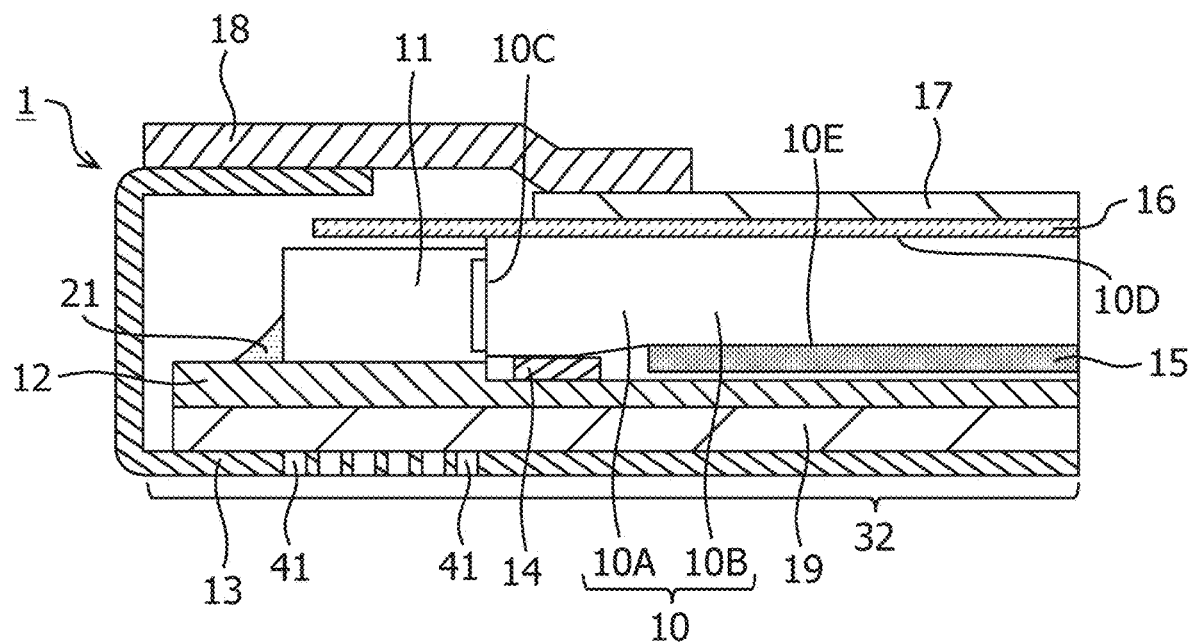
FIG. 8A is a sectional view of the surface light source device according to the embodiment.
Figure 8B:
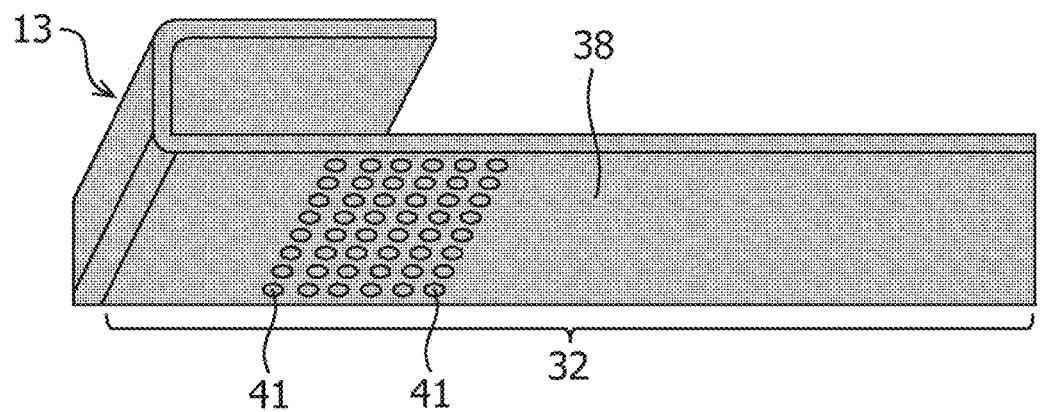
FIG. 8B is a perspective view of the sheet metal frame according to the embodiment.

As shown in FIGS. 8A and 8B, a plurality of holes 41 may be provided in the bottom portion 32. FIG. 8A is a sectional view of the surface light source device 1 according to the embodiment. FIG. 8B is a perspective view of the sheet metal frame 13 according to the embodiment. The holes 41 may be through holes penetrating the bottom portion 32. The holes 41 may also be recessed portions that do not penetrate the bottom portion 32 and instead are recessed from a surface 38 of the bottom portion 32 on the opposite side to the bottom surface 31 toward the bottom surface 31. The plurality of holes 41 may have identical shapes and sizes, or the plurality of holes 41 may have different shapes and sizes. By providing the holes 41 in the bottom portion 32, the surface area of the sheet metal frame 13 increases, leading to an improvement in the heat dissipation ability of the sheet metal frame 13 and an improvement in the heat dissipation ability of the light sources 11. In the example configuration of the sheet metal frame 13 shown in FIGS. 8A and 8B, the plurality of holes 41 are provided in the bottom portion 32, but the embodiment is not limited to the example configuration of the sheet metal frame 13 shown in FIGS. 8A and 8B, and instead, a single hole 41 may be provided in the bottom portion 32. The light sources 11 and the holes 41 may overlap when seen from above in the normal direction of the bottom surface 31. By positioning the holes 41 provided in the bottom portion 32 directly below the light sources 11, the heat transferred to the sheet metal frame 13 from the light sources 11 can dissipate to the outside more easily.

Figure 9A:
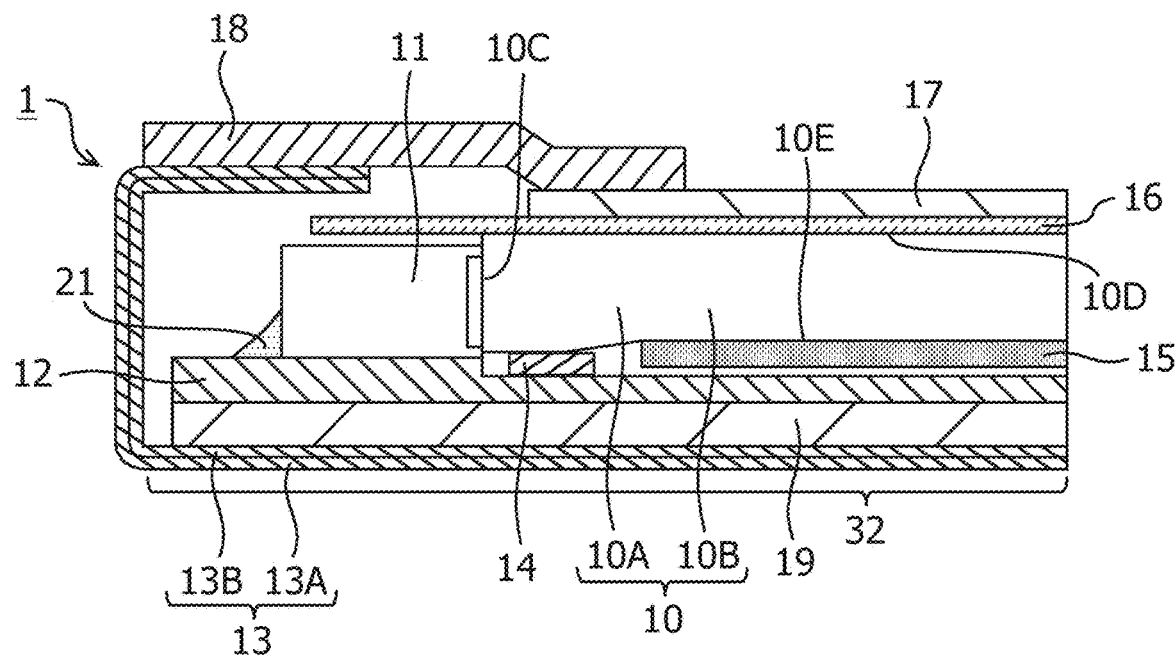
FIG. 9A is a sectional view of the surface light source device according to the embodiment.
Figure 9B:
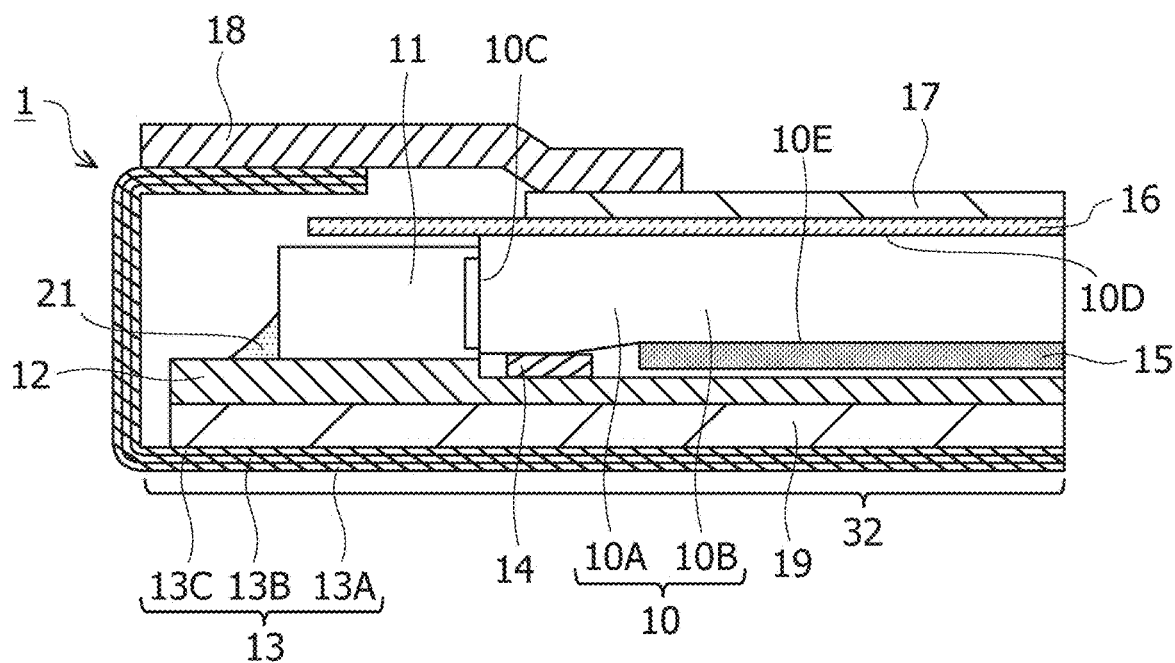
FIG. 9B is a sectional view of the surface light source device according to the embodiment.

An example in which the sheet metal frame 13 has a single-layer structure employing a single type of metal from among aluminum, aluminum alloy, and stainless steel was described above, but the sheet metal frame 13 according to the embodiment is not limited to a single-layer structure. The sheet metal frame 13 according to the embodiment may have a cladding structure (a multi-layer structure) formed by laminating a plurality of different types of metal. FIGS. 9A and 9B are sectional views of the surface light source device 1 according to the embodiment. The sheet metal frame 13 shown in FIG. 9A is a two-layer material including sheet metal frames 13A and 13B. The sheet metal frame 13A is formed from stainless steel, for example, and the sheet metal frame 13B is formed from copper (Cu), for example. The rigidity of stainless steel is greater than the rigidity of copper, while the thermal conductivity of copper is greater than the thermal conductivity of stainless steel. By employing stainless steel as the material of the sheet metal frame 13A, which serves as the surface layer (the outer layer) of the sheet metal frame 13, and employing copper as the material of the sheet metal frame 13B, Which serves as the inner layer of the sheet metal frame 13, the heat dissipation ability of the sheet metal frame 13 can be improved while improving the rigidity of the sheet metal frame 13. The sheet metal frame 13A and the sheet metal frame 13B may be joined by roll-bonding, for example. Further, a metal exhibiting high thermal conductivity other than copper may be used as the material of the sheet metal frame 13B.

The sheet metal frame 13 shown in FIG. 9B is a three-layer material including sheet metal frames 13A, 13B, and 13C. For example, the sheet metal frame 13A is formed from stainless steel, the sheet metal frame 13B is formed from copper, and the sheet metal frame 13C is formed from stainless steel. By employing stainless steel for the sheet metal frame 13A serving as the surface layer (the outer layer) of the sheet metal frame 13, employing copper for the sheet metal frame 13B serving as the intermediate layer of the sheet metal frame 13, and employing stainless steel for the sheet metal frame 13C serving as the inner layer of the sheet metal frame 13, the heat dissipation ability of the sheet metal frame 13 can be improved while improving the rigidity of the sheet metal frame 13. The sheet metal frame 13A may be joined to the sheet metal frame 13B and the sheet metal frame 13B may be joined to the sheet metal frame 13C by roll-bonding, for example.

FIG. 10 is a view showing properties of metal materials. Metal materials having the properties shown in FIG. 10 may be used as the material of the sheet metal frame 13. Note, however, that the material of the sheet metal frame 13 according to the embodiment is not limited to the metal materials shown in FIG. 10, and a metal material other than the metal materials shown in FIG. 10 may be used as the sheet metal frame 13 according to the embodiment. Respective thermal conductivity values of aluminum B, an aluminum alloy C, an aluminum alloy E, and an aluminum alloy F shown in FIG. 10 are 130 W/m·K or more. From the viewpoint of the heat dissipation ability of the surface light source device 1, therefore, the aluminum B, the aluminum alloy C, the aluminum alloy E, or the aluminum alloy F shown in FIG. 10 is preferably used as the material of the sheet metal frame 13. The thermal conductivity values of the aluminum B, the aluminum alloy E, and the aluminum alloy F shown in FIG. 10 respectively are 200 W/m·K or more. From the viewpoint of the heat dissipation ability of the surface light source device 1, therefore, the aluminum B, the aluminum alloy E, or the aluminum alloy F shown in FIG. 10 is more preferably used as the material of the sheet metal frame 13.

Respective strength values of stainless steel A, an aluminum alloy D, and the aluminum alloy F shown in FIG. 10 are 260 N/mm$^2$ or more. From the viewpoint of the strength of the surface light source device 1, therefore, the stainless steel A, the aluminum alloy D, or the aluminum alloy F shown in FIG. 10 is preferably used as the material of the sheet metal frame 13. The thermal conductivity value of the aluminum alloy F shown in FIG. 10 is 130 W/m·K or more, and the strength of the aluminum alloy F shown in FIG. 10 is 260 N/mm$^2$ or more. From the viewpoint of both the heat dissipation ability and the strength of the surface light source device 1, therefore, the aluminum alloy F shown in FIG. 10 is preferably used as the material of the sheet metal frame 13.

<Verification Results>

Figure 11:
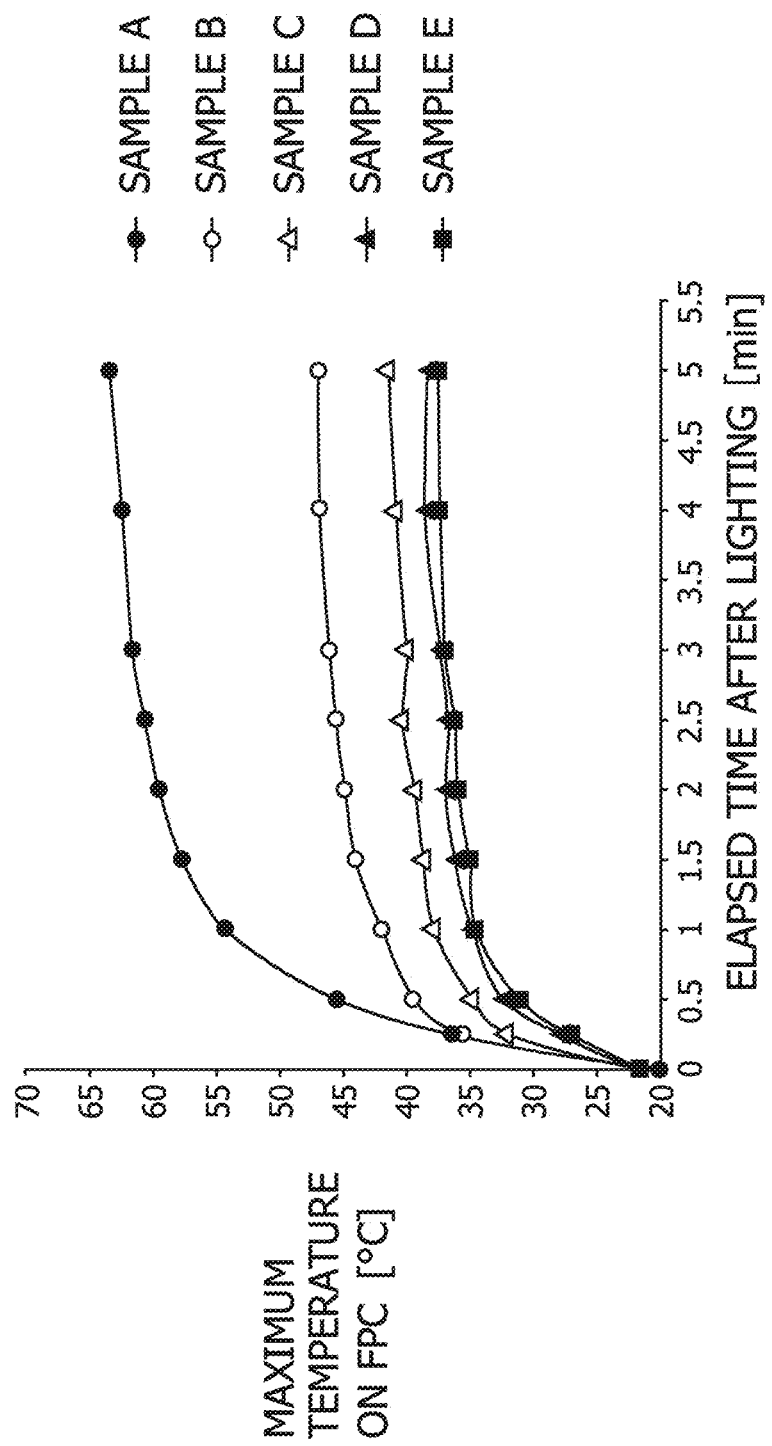
FIG. 11 is a view showing verification data relating to a maximum temperature on an FPC, according to the embodiment.

FIG. 11 is a view showing verification data relating to a maximum temperature on the FPC 12 of the surface light source device 1 according to the embodiment. The vertical axis in FIG. 11 shows the maximum temperature (° C.) on the FPC 12, and the horizontal axis in FIG. 11 shows the elapsed time (min) following lighting of the light sources 11. In surface light source devices 1 of samples A and B shown in FIG. 11, stainless steel is used as the material of the sheet metal frame 13 and the thickness of the sheet metal frame 13 is 0.10 mm. In surface light source devices 1 of samples C, D, and E shown in FIG. 11, aluminum alloy is used as the material of the sheet metal frame 13 and the thickness of the sheet metal frame 13 is 0.15 mm.

The surface light source device 1 of sample A shown in FIG. 11 does not include the heat conduction members 19, 19A, 19B. In other words, the surface light source device 1 of sample A shown in FIG. 11 is structured such that the FPC 12 contacts the bottom portion 32. The surface light source device 1 of sample B shown in FIG. 11 includes the heat conduction members 19A and 19B. In other words, the surface light source device 1 of sample 13 shown in FIG. 11 is structured such that the heat conduction member 19A is disposed between the FPC 12 and the bottom portion 32 and the heat conduction member 19B is disposed between the light guide plate 10 and the bottom portion 32. In the surface light source device 1 of sample B shown in FIG. 11, the heat conduction member 19A is thermally conductive double-sided tape, the heat conduction member 19B is a graphite sheet, and the thickness of the heat conduction member 19B is 50 mm.

The surface light source device 1 of sample C shown in FIG. 11 does not include the heat conduction members 19A and 19B. In other words, the surface light source device 1 of sample C shown in FIG. 11 is structured such that the FPC 12 contacts the bottom portion 32. The surface light source device 1 of sample D shown in FIG. 11 includes the heat conduction member 19. In other words, the surface light source device 1 of sample D shown in FIG. 11 is structured such that the heat conduction member 19 is disposed between the FPC 12 and the bottom portion 32. In the surface light source device 1 of sample D shown in FIG. 11, the heat conduction member 19 is thermally conductive double-sided tape. The surface light source device 1 of sample E shown in FIG. 11 includes the heat conduction member 19. In other words, the surface light source device 1 of sample F shown in FIG. 11 is structured such that the heat conduction member 19 is disposed between the FPC 12 and the bottom portion 32. In the surface light source device 1 of sample E shown in FIG. 11, the heat conduction member 19 is a graphite sheet, and the thickness of the heat conduction member 19 is 5 mm.

In the surface light source device 1 of sample A shown in FIG. 11, it was confirmed that following the elapse of 5 minutes (min) from lighting of the light sources 11, the maximum temperature on the FPC 12 was approximately 63° C. In the surface light source device 1 of sample B shown in FIG. 11, it was confirmed that following the elapse of 5 minutes (min) from lighting of the light sources 11, the maximum temperature on the FPC 12 was approximately 45° C. When stainless steel is used as the material of the sheet metal frame 13, the maximum temperature on the FPC 12 can be reduced by approximately 18° C. by disposing thermally conductive double-sided tape between the FPC 12 and the bottom portion 32 and disposing a graphite sheet between the light guide plate 10 and the bottom portion 32.

In the surface light source device 1 of sample C shown in FIG. 11, it was confirmed that following the elapse of 5 minutes (min) from lighting of the light sources 11, the maximum temperature on the FPC 12 was approximately 40° C. In the surface light source device 1 of sample D shown in FIG. 11, it was confirmed that following the elapse of 5 minutes (min) from lighting of the light sources 11, the maximum temperature on the FPC 12 was approximately 37° C. In the surface source device 1 of sample F shown in FIG. 11, it was confirmed that following the elapse of 5 minutes (min) from lighting of the light sources 11, the maximum temperature on the FPC 12 was approximately 36° C. When the surface light source device 1 does not include the heat conduction members 19, 19A, 19B, the maximum temperature on the FPC 12 can be reduced by approximately 23° C. by changing the material of the sheet metal frame 13 from stainless steel to aluminum alloy. When aluminum alloy is used as the material of the sheet metal frame 13, the maximum temperature on the FPC 12 can be reduced by approximately 3° C. by disposing thermally conductive double-sided tape between the FPC 12 and the bottom portion 32. When aluminum alloy is used as the material of the sheet metal frame 13, the maximum temperature on the FPC 12 can be reduced by approximately 4° C. by disposing a graphite sheet between the FPC 12 and the bottom portion 32.

Furthermore, as shown in FIG. 12A, an end portion 16A of the diffusion sheet 16 may be printed black, or a black member may be provided on the end portion 16A of the diffusion sheet 16. The black member may be PET (polyethylene terephthalate) printed black, for example. As shown in FIG. 12B, strong light from the light sources 11 may not be blocked by the light-blocking double-sided tape 18, and as a result, strong light from the light sources 11 may be directly visible from the upper surface side. Thick arrows in FIG. 12B show an example of the directions of the light emitted from the light sources 11, The black printing on the end portion 16A of the diffusion sheet 16 or the black member provided on the end portion 16A of the diffusion sheet 16 absorbs, and thereby blocks, strong light from the light sources 11, and as a result, a situation in which strong light from the light sources 11 is directly visible from the upper surface side can be avoided. FIGS. 12C to 12E are examples of cases showing the surface light source device 1 from the upper surface side. In FIG. 12C, the end portion 16A of the diffusion sheet 16 is printed white, and therefore the end portion 16A of the diffusion sheet 16 is not printed black. Moreover, a black member is not provided on the end portion 16A of the diffusion sheet 16. In FIG. 12D, the end portion 16A of the diffusion sheet 16 is printed black. In FIG. 12E, a black member is provided on the end portion 16A of the diffusion sheet 16. As shown in FIGS. 12C to 12E, by printing the end portion 16A of the diffusion sheet 16 white or providing a black member on the end portion 16A of the diffusion sheet 16, strong light from the light sources 11 is blocked.

With the surface light source device 1 according to the embodiment, the heat dissipation ability of the light sources 11 is improved by causing the top portion 34 forming a part of the sheet metal frame 13 to project to the bottom surface 31 side so that the heat of the light sources 11 is transferred to the sheet metal frame 13 through the top portion 34. Further, with the surface light source device 1 according to the embodiment, the heat dissipation ability of the light sources 11 is improved by disposing the FPC 12 between the light sources 11 and the bottom portion 32 and not forming an air layer between the FPC 12 and the bottom portion 32 so that the heat of the light sources 11 is transferred to the sheet metal frame 13 through the FPC 12. Hence, by installing the surface light source device 1 as a backlight, a liquid crystal display device having an improved heat dissipation ability can be provided.

Figure 13:
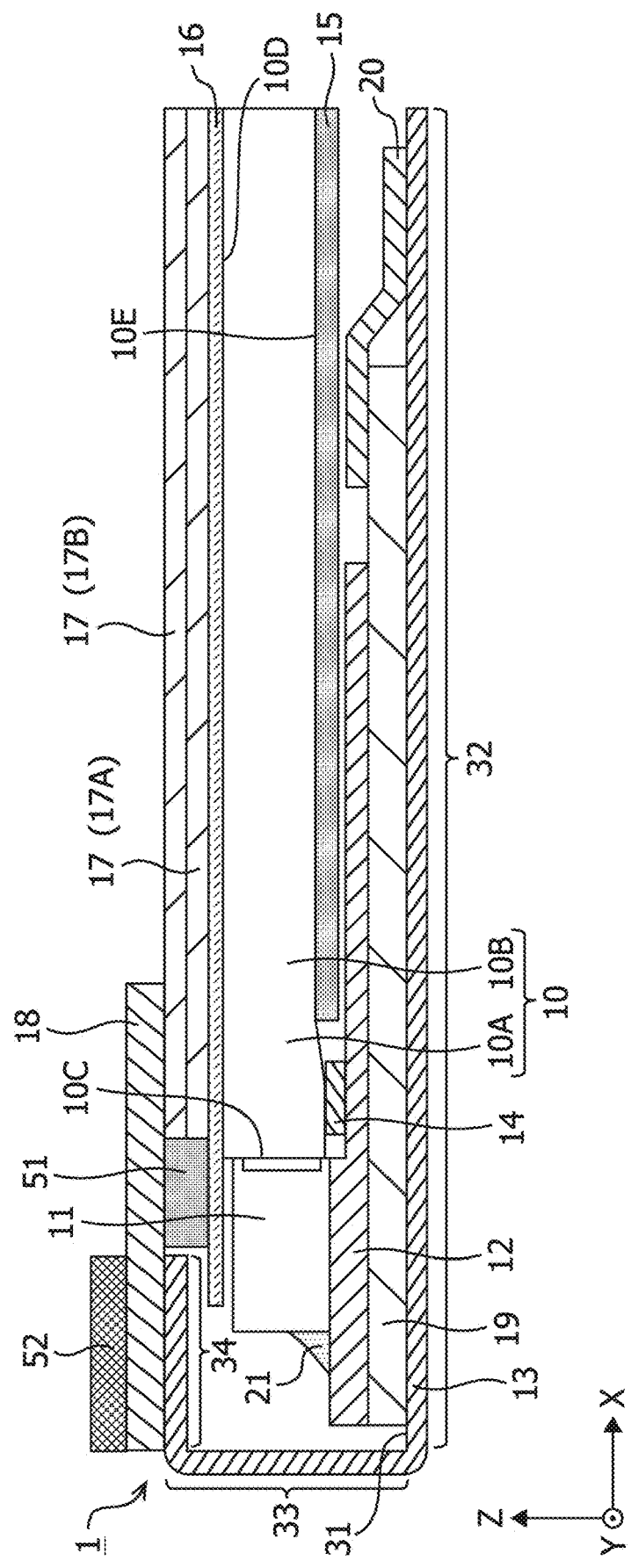
FIG. 13 is a sectional view of the surface light according to the embodiment.
Figure 14:
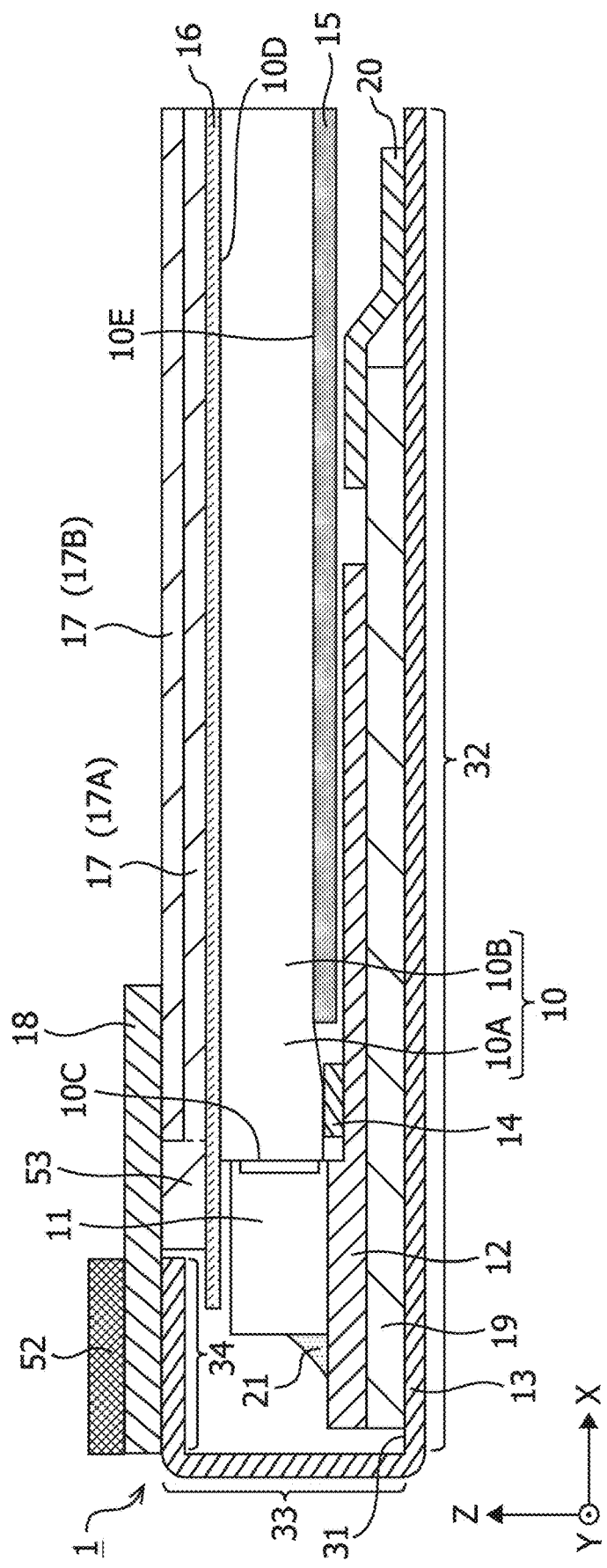
FIG. 14 is a sectional view of the surface light source device according to the embodiment.

For example, when a large load or impact is exerted on a liquid crystal display device having the surface light source device 1 and the display panel 2, stress may act on the display panel 2 from the top portion 34. Referring to FIGS. 13 to 15, examples in which stress acting on the display panel 2 is suppressed will be described.

FIG. 13 is a sectional view of the surface light source device 1 according to the embodiment. FIG. 3 is a sectional view seen from a Y direction. As shown in FIG. 13, the diffusion sheet 16 is provided on the light exit surface 101) of the light guide plate 10. In the example of FIG. 13, the surface light source device 1 includes two prism sheets 17, a lower side prism sheet 17A being provided on the diffusion sheet 16 and an upper side prism sheet 17B being provided on the lower side prism sheet 17A. The surface light source device 1 includes a spacer 51 disposed adjacent to the top portion 34 in a direction opposing to the side wall 33. In the example of FIG. 13, the direction opposing to the side wall 33 is an X direction. The spacer 51 is housed in the sheet metal frame 13. The width of the spacer 51 in the Y direction is equal to or substantially equal to the width of the top portion 34 in the Y direction. Alternatively, the width of the spacer 51 in the Y direction may be smaller than the width of the top portion 34 in the Y direction. In the example of FIG. 13, the normal direction of the bottom surface 31 is a Z direction, and a direction that is orthogonal to the Z direction and orthogonal to the X direction is the Y direction. The thickness of the spacer 51 is greater than the respective thicknesses of the lower side prism sheet 17A and the upper side prism sheet 17B.

As shown in FIG. 13, the light-blocking double-sided tape 18 is provided on the upper side prism sheet 17B, the spacer 51, and the top portion 34. The light-blocking double-sided tape 18 serves as an example of light-blocking tape. In the example of FIG. 13, the light-blocking double-sided tape 18 is adhered to an upper surface of the upper side prism sheet 17B, an upper surface of the spacer 51, and an upper surface of the top portion 34. The upper surface of the upper side prism sheet 17B, the upper surface of the spacer 51, and the upper surface of the top portion 34 are oriented in the same direction as the bottom surface 31. A height from the bottom surface 31 to the upper surface of the top portion 34 may match a height from the bottom surface 31 to the upper surface of the spacer 51. Alternatively, the height from the bottom surface 31 to the upper surface of the spacer 51 may be higher than the height from the bottom surface 31 to the upper surface of the top portion 34 or lower than the height from the bottom surface 31 to the upper surface of the top portion 34. The height from the bottom surface 31 to the upper surface of the spacer 51 may match a height from the bottom surface 31 to the upper surface of the upper side prism sheet 17B. Alternatively, the height from the bottom surface 31 to the upper surface of the spacer 51 may be higher than the height from the bottom surface 31 to the upper surface of the upper side prism sheet 17B or lower than the height from the bottom surface 31 to the upper surface of the upper side prism sheet 17B.

As shown in FIG. 13, a buffer member 52 is provided on the light-blocking double-sided tape 18. In the example of FIG. 13, the top portion 34 and the buffer member 52 overlap in the normal direction of the bottom surface 31. The embodiment is not limited to the example of FIG. 13, and at least a part of the top portion 34 may overlap at least a part of the buffer member 52 in the normal direction of the bottom surface 31. The buffer member 52 is constituted by a base material having a cushioning property, such as a sponge member, a rubber member, or a resin member, for example. The buffer member 2 may also be formed in tape form.

By disposing the spacer 51 adjacent to the top portion 34, stress applied to the display panel 2 from the top portion 34 is suppressed. Further, by disposing the buffer member 52 on the light-blocking double-sided tape 18 so that at least a part of the top portion 34 and at least a pall of the buffer member 52 overlap in the normal direction of the bottom surface 31, stress applied to the display panel 2 from the top portion 34 is suppressed. In the example of FIG. 13, the surface light source device 1 includes the spacer 51 and the buffer member 52, but the embodiment is not limited to the example of FIG. 13, and the surface light source device 1 may include either one of the spacer 51 and the buffer member 52.

In the example of FIG. 13, the upper side prism sheet 17B and the top portion 34 are fixed to the light-blocking double-sided tape 18. In the example of FIG. 13, the spacer 51 is fixed to at least one of the diffusion sheet 16 and the light-blocking double-sided tape 18. The light-blocking double-sided tape 18 has an adhesive property. The spacer 51 may be fixed to the light-blocking double-sided tape 18 by adhering the spacer 51 to the light-blocking double-sided tape 18. In the example of FIG. 13, the spacer 51 is disposed between the top portion 34 and the prism sheet 17 (17A, 17B) in the direction opposing to the side wall 33. By disposing the spacer 51 adjacent to the lower side prism sheet 17A, movement of the lower side prism sheet 17A is suppressed, thereby suppressing positional deviation of the lower side prism sheet 17A. The diffusion sheet 16 may be extended to between the light sources 11 and the light-blocking double-sided tape 18, and the spacer 51 may be fixed to the diffusion sheet 16. For example, the spacer 51 may be fixed to the diffusion sheet 16 by adhering adhesive double-sided tape to the lower surface of the spacer 51. The lower surface of the spacer 51 is the surface on the opposite side of the spacer 51 to the upper surface, and faces the bottom surface 31.

The spacer 51 may be a member having a light-blocking property. The spacer 51 may be formed from PET printed black, for example. By providing the spacer 51 with a light-blocking property, light leakage to the outside of the surface light source device 1 can be suppressed more effectively. The buffer member 52 is fixed to the light-blocking double-sided tape 18. The buffer member 52 is fixed to the light-blocking double-sided tape 18 by adhering the buffer member 52 to the light-blocking double-sided tape 18. The width of the buffer member 52 in the Y direction is equal to or substantially equal to the width of the top portion 34 in the Y direction. Alternatively, the width of the buffer member 52 in the Y direction may be smaller than the width of the top portion 34 in the Y direction.

FIG. 14 is a sectional view of the surface light source device 1 according to the embodiment. FIG. 14 is a sectional view seen from the Y direction. As shown in FIG. 14, the diffusion sheet 16 is provided on the light exit surface 10D of the light guide plate 10. In the example of FIG. 14, the surface source device 1 includes two prism sheets 17, the lower side prism sheet 17A being provided on the diffusion sheet 16 and the upper side prism sheet 17B being provided on the lower side prism sheet 17A. The surface light source device 1 includes a spacer 53 disposed adjacent to the top portion 34 in the direction opposing to the side wall 33. In the example of FIG. 14, the direction opposing to the side wall 33 is the X direction. The spacer 53 is housed in the sheet metal frame 13. The spacer 53 forms a part of the lower side prism sheet 17A. Accordingly, the spacer 53 is formed integrally with the lower side prism sheet 17A. The width of the spacer 53 in the Y direction is equal to or substantially equal to the width of the top portion 34 in the Y direction. Alternatively, the width of the spacer 53 in the Y direction may be smaller than the width of the top portion 34 in the Y direction. In the example of FIG. 14, the normal direction of the bottom surface 31 is the Z direction, and a direction that is orthogonal to the Z direction and orthogonal to the X direction is the Y direction. The thickness of the spacer 53 is greater than the respective thicknesses of the lower side prism sheet 17A and the upper side prism sheet 17B.

As shown in FIG. 14, the light-blocking double-sided tape 18 is provided on the upper side prism sheet 17B, the spacer 53, and the top portion 34. In the example of FIG. 14, the light-blocking double-sided tape 18 is adhered to the upper surface of the upper side prism sheet 17B, the upper surface of the spacer 53, and the upper surface of the top portion 34. The upper surface of the upper side prism sheet 17B, the upper surface of the spacer 53, and the upper surface of the top portion 34 are oriented in the same direction as the bottom surface 31. The height from the bottom surface 31 to the upper surface of the top portion 34 may match a height from the bottom surface 31 to the upper surface of the spacer 53. Alternatively, the height from the bottom surface 31 to the upper surface of the spacer 53 may be higher than the height from the bottom surface 31 to the upper surface of the top portion 34 or lower than the height from the bottom surface 31 to the upper surface of the top portion 34. The height from the bottom surface 31 to the upper surface of the spacer 53 may match a height from the bottom surface 31 to the upper surface of the upper side prism sheet 17B. Alternatively, the height from the bottom surface 31 to the upper surface of the spacer 53 may be higher than the height from the bottom surface 31 to the upper surface of the upper side prism sheet 17B or lower than the height from the bottom surface 31 to the upper surface of the upper side prism sheet 17B.

As shown in FIG. 14, the buffer member 52 is provided on the light-blocking double-sided tape 18. The buffer member 52 is fixed to the light-blocking double-sided tape 18. In the example of FIG. 14, the top portion 34 and the buffer member 52 overlap in the normal direction of the bottom surface 31. The embodiment is not limited to the example of FIG. 14, and at least a part of the top portion 34 may overlap at least a part of the buffer member 52 in the normal direction of the bottom surface 31.

By disposing the spacer 53 adjacent to the top portion 34, stress applied to the display panel 2 from the top portion 34 is suppressed. Further, by disposing the buffer member 52 on the light-blocking double-sided tape 18 so that at least a part of the top portion 34 and at least a part of the buffer member 52 overlap in the normal direction of the bottom surface 31, stress applied to the display panel 2 from the top portion 34 is suppressed. In the example of FIG. 14, the surface light source device 1 includes buffer member 52 and the spacer 53 but the embodiment is not limited to the example of FIG. 14, and the surface light source device 1 may include either one of the buffer member 52 and the spacer 53.

In the example of FIG. 14, the upper side prism sheet 17B and the top portion 34 are fixed to the light-blocking double-sided tape 18. In the example of FIG. 14, the spacer 53 is fixed to at least one of the diffusion sheet 16 and the light-blocking double-sided tape 18. The spacer 53 may be fixed to the light-blocking double-sided tape 18 by adhering the spacer 53 to the light-blocking double-sided tape 18. In the example of FIG. 14, the spacer 53 is disposed between the top portion 34 and the prism sheet 17 (17A, 17B) in the direction opposing to the side wall 33. By disposing the spacer 53 adjacent to the lower side prism sheet 17A, movement of the lower side prism sheet 17A is suppressed, thereby suppressing positional deviation of the lower side prism sheet 17A. The diffusion sheet 16 may be extended to between the light sources 11 and the light-blocking double-sided tape 18, and the spacer 53 may be fixed to the diffusion sheet 16. For example, the spacer 53 may be fixed to the diffusion sheet 16 by adhering adhesive double-sided tape to the lower surface of the spacer 53. The lower surface of the spacer 53 is the surface on the opposite side of the spacer 53 to the upper surface, and faces the bottom surface 31.

FIG. 15 is a sectional view of the surface light source device 1 according to the embodiment. FIG. 15 is a sectional view seen from the Y direction. As shown in FIG. 15, the diffusion sheet 16 is provided on the light exit surface 101) of the light guide plate 10. In the example of FIG. 15, the surface light source device 1 includes two prism sheets 17, the lower side prism sheet 17A being provided on the diffusion sheet 16 and the upper side prism sheet 17B being provided on the lower side prism sheet 17A. The surface light source device 1 includes a spacer 54 disposed adjacent to the top portion 34 in the direction opposing to the side wall 33. In the example of FIG. 15, the direction opposing to the side wall 33 is the X direction. The spacer 54 is housed in the sheet metal frame 13. The spacer 54 forms a part of the upper side prism sheet 17B. Accordingly, the spacer 54 is formed integrally with the upper side prism sheet 17B. The width of the spacer 54 in the Y direction is equal to or substantially equal to the width of the top portion 34 in the Y direction. Alternatively, the width of the spacer 54 in the Y direction may be smaller than the width of the top portion 34 in the Y direction. In the example of FIG. 15, the normal direction of the bottom surface 31 is the Z direction, and a direction that is orthogonal to the Z direction and orthogonal to the X direction is the Y direction. The thickness of the spacer 54 is greater than the respective thicknesses of the lower side prism sheet 17A and the upper side prism sheet 17B.

As shown in FIG. 15, the light-blocking double-sided tape 18 is provided on the upper side prism sheet 17B, the spacer 54, and the top portion 34. In the example of FIG. 15, the light-blocking double-sided tape 18 is adhered to the upper surface of the upper side prism sheet 17B, the upper surface of the spacer 54, and the upper surface of the top portion 34. The upper surface of the upper side prism sheet 17B, the upper surface of the spacer 54, and the upper surface of the top portion 34 are oriented in the same direction as the bottom surface 31. The height from the bottom surface 31 to the upper surface of the top portion 34 may match a height from the bottom surface 31 to the upper surface of the spacer 54. Alternatively, the height from the bottom surface 31 to the upper surface of the spacer 54 may be higher than the height from the bottom surface 31 to the upper surface of the top portion 34 or lower than the height from the bottom surface 31 to the upper surface of the top portion 34. The height from the bottom surface 31 to the upper surface of the spacer 54 may match a height from the bottom surface 31 to the upper surface of the upper side prism sheet 17B. Alternatively, the height from the bottom surface 31 to the upper surface of the spacer 54 may be higher than the height from the bottom surface 31 to the upper surface of the upper side prism sheet 17B or lower than the height from the bottom surface 31 to the upper surface of the upper side prism sheet 17B.

As shown in FIG. 15, the buffer member 52 is provided on the light-blocking double-sided tape 18. The buffer member 52 is fixed to the light-blocking double-sided tape 18. In the example of FIG. 15, the top portion 34 and the buffer member 52 overlap in the normal direction of the bottom surface 31. The embodiment is not limited to the example of FIG. 15, and at least a part of the top portion 34 may overlap at least a part of the buffer member 52 in the normal direction of the bottom surface 31.

By disposing the spacer 54 adjacent to the top portion 34, stress applied to the display panel 2 from the top portion 34 is suppressed. Further, by disposing the buffer member 52 on the light-blocking double-sided tape 18 so that at least a part of the top portion 34 and at least a part of the buffer member 52 overlap in the normal direction of the bottom surface 31, stress applied to the display panel 2 from the top portion 34 is suppressed. In the example of FIG. 15, the surface light source device 1 includes the buffer member 52 and the spacer 54, but the embodiment is not limited to the example of FIG. 15, and the surface light source device 1 may include either one of the buffer member 52 and the spacer 54.

In the example of FIG. 15, the upper side prism sheet 17B and the top portion 34 are fixed to the light-blocking double-sided tape 18. In the example of FIG. 15, the spacer 54 is fixed to at least one of the diffusion sheet 16 and the light-blocking double-sided tape 18. The spacer 54 may be fixed to the light-blocking double-sided tape 18 by adhering the spacer 54 to the light-blocking double-sided tape 18. In the example of FIG. 15, the spacer 54 is disposed between the top portion 34 and the prism sheet 17 (17A, 17B) in the direction opposing to the side wall 33. By disposing the spacer 54 adjacent to the lower side prism sheet 17A, movement of the lower side prism sheet 17A is suppressed, thereby suppressing positional deviation of the lower side prism sheet 17A. The diffusion sheet 16 may be extended to between the light sources 11 and the light-blocking double-sided tape 18, and the spacer 54 may be fixed to the diffusion sheet 16. For example, the spacer 54 may be fixed to the diffusion sheet 16 by adhering adhesive double-sided tape to the lower surface of the spacer 54. The lower surface of the spacer 54 is the surface on the opposite side of the spacer 53 to the upper surface, and faces the bottom surface 31.

Furthermore, a liquid crystal display device of this type can be installed in various electronic devices. Examples of electronic devices having this type of display device include smartphones, digital cameras, tablet terminals, electronic books, wearable devices, car navigation devices, electronic dictionaries, electronic billboards, and so on. This type of electronic device can be reduced in size and thickness, and therefore an improvement in the heat dissipation ability of the electronic device can be expected.

REFERENCE SIGNS LIST

1 Surface light source device
2 Display panel
10 Light guide plate
11 Light source
12 FPC
13, 13A, 13B, 13C Sheet metal frame
14 FPC fixing tape
15 Reflective sheet
16 Diffusion sheet
17 Prism sheet
18 Light-blocking double-sided tape
19, 19A, 19B Heat conduction member
20 Fixing tape
21 Solder fillet
22 insulating member
23 Resin frame
24 Support member
51, 53, 54 Spacer
52 Damping member

The invention claimed is:

1. A surface light source device comprising:
   a light source;
   a light guide plate that has, on a side thereof, a light entrance surface through which light emitted by the light source enters, and that emits the light entering through the light entrance surface from a light exit surface;
   a wiring board;
   a metal frame that includes a bottom portion having a bottom surface that faces a surface on an opposite side to the light exit surface, a side wall erected on an outer periphery of the bottom surface, and a projecting portion provided on the side wall so as to project toward the bottom surface side, and that houses the light source, the light guide plate, and the wiring board,
   a diffusion sheet provided on the light exit surface;
   a prism sheet provided on the diffusion sheet;
   light-blocking tape provided on the projecting portion and the prism sheet; and
   a buffer member provided on the light-blocking tape,
   wherein at least a part of the light source is disposed between the bottom portion and the projecting portion, and
   the wiring board is disposed between the light source and the bottom portion,
   the light-blocking tape and the buffer member are arranged outside an area between the bottom portion and the projecting portion,
   at least a part of the projecting portion and at least a part of the buffer member overlap in the normal direction of the bottom surface.

2. The surface light source device according to claim 1, comprising a heat conduction member provided between the wiring board and the bottom portion.

3. The surface light source device according to claim 2, wherein the heat conduction member is extended to between the light guide plate and the bottom portion.

4. The surface light source device according to claim 2, wherein the heat conduction member is a graphite sheet, thermally conductive tape, or a composite member constituted by a graphite sheet and thermally conductive tape.

5. The surface light source device according to claim 1, comprising:
   a first heat conduction member disposed between the wiring board and the bottom portion; and
   a second heat conduction member disposed between the light guide plate and the bottom portion.

6. The surface light source device according to claim 5, wherein the first heat conduction member is a graphite sheet, thermally conductive tape, or a composite member constituted by a graphite sheet and thermally conductive tape, and
   the second heat conduction member is a graphite sheet, thermally conductive tape, or a composite member constituted by a graphite sheet and thermally conductive tape.

7. The surface light source device according to claim 1, wherein the wiring board is extended to between the light guide plate and the bottom portion.

8. The surface light source device according to claim 1, wherein the metal frame is formed from aluminum, aluminum alloy, or stainless steel.

9. The surface light source device according to claim 1, wherein the side wall has a first inner surface connected to the bottom surface,
   the projecting portion has a second inner surface connected to the first inner surface, and
   the bottom surface, the first inner surface, and the second inner surface are covered by an insulating member.

10. The surface light source device according to claim 1, wherein the bottom portion has a through hole that penetrates the bottom portion or a recessed portion recessed from a surface on an opposite side to the bottom surface toward the bottom surface.

11. The surface light source device according to claim 1, wherein a thermal conductivity of the metal frame is 130 W/m·K.

12. The surface light source device according to claim 1, wherein a strength of the metal frame is 260 N/mm2 or more.

13. The surface light source device according to claim 1, comprising a spacer housed in the metal frame and disposed adjacent to the projecting portion in a direction opposing to the side wall.

14. The surface light source device according to claim 13, wherein the spacer is disposed between the projecting portion and the prism sheet in the direction opposing to the side wall and is fixed to the light-blocking tape.

15. The surface light source device according to claim 13, wherein the spacer is disposed between the projecting portion and the prism sheet in the direction opposing to the side wall and is fixed to the diffusion sheet.

16. The surface light source device according to claim 13, wherein the spacer has a light-blocking property.

17. A display device comprising:
the surface light source device according to claim 1; and
a display panel that receives light emitted from the surface light source device.

18. An electronic device comprising the display device according to claim 17.

* * * * *